(12) United States Patent
Lepeska et al.

(10) Patent No.: US 9,043,385 B1
(45) Date of Patent: May 26, 2015

(54) STATIC TRACKER

(75) Inventors: Peter Lepeska, Boston, MA (US);
William B. Sebastian, Falmouth, MA (US)

(73) Assignee: ViaSat, Inc., Carlsbad, CA (US)

( * ) Notice: Subject to any disclaimer, the term of this patent is extended or adjusted under 35 U.S.C. 154(b) by 1037 days.

(21) Appl. No.: 13/089,255

(22) Filed: Apr. 18, 2011

Related U.S. Application Data

(60) Provisional application No. 61/325,341, filed on Apr. 18, 2010, provisional application No. 61/325,344, filed on Apr. 18, 2010, provisional application No. 61/325,342, filed on Apr. 18, 2010.

(51) Int. Cl.
*G06F 15/16* (2006.01)
*G06F 17/30* (2006.01)

(52) U.S. Cl.
CPC .............................. *G06F 17/30902* (2013.01)

(58) Field of Classification Search
CPC ... G06F 17/30; G06F 17/30902; H04L 29/00; H04L 29/12066; H04L 29/12811; H04L 61/1511; H04L 61/6009; H04L 67/02; H04L 67/26; H04L 67/2847
USPC ................. 709/203, 213, 217, 218, 224, 232; 715/700–866
See application file for complete search history.

(56) References Cited

U.S. PATENT DOCUMENTS

| | | | |
|---|---|---|---|
| 5,408,470 A | 4/1995 | Rothrock et al. | |
| 5,740,367 A | 4/1998 | Spilo | |
| 5,870,754 A | 2/1999 | Dimitrova et al. | |
| 5,905,981 A | 5/1999 | Lawler | |
| 6,085,193 A | 7/2000 | Malkin et al. | |
| 6,085,226 A | 7/2000 | Horvitz | |
| 6,178,461 B1 | 1/2001 | Chan et al. | |

(Continued)

FOREIGN PATENT DOCUMENTS

| WO | WO-01/61886 A2 | 8/2001 |
|---|---|---|
| WO | WO-01/84777 A2 | 11/2001 |

(Continued)

OTHER PUBLICATIONS

Frantzeskou et al., "Effective Identification of Source Code Authors Using Byte-Level Information," ICSE '06, May 20-28, 2006, Shanghai, China, ACM 1-59593-085-X/06/0005, XP040040085, pp. 893-896.

(Continued)

*Primary Examiner* — Phuoc Nguyen
*Assistant Examiner* — Davoud Zand
(74) *Attorney, Agent, or Firm* — Kilpatrick Townsend & Stockton LLP

(57) ABSTRACT

The present invention relates to systems, apparatus, and methods of scanning a response to a first HTTP request for a web page in order to identify a web object for prefetching, and using a static tracker to identify and improve results. In one potential alternative embodiment, after a response is scanned a web object may be prefetched to a proxy server prior to a browser requesting the web object. The proxy server may observe one or more HTTP requests that are associated with the response to the first HTTP request for the web page and measure the success of the prefetching. After success is measured for the specific instance of the web object and the web page, a success rate for prefetching or not prefetching the web object as associated with the web page may be updated.

20 Claims, 22 Drawing Sheets

(56) References Cited

U.S. PATENT DOCUMENTS

| | | | |
|---|---|---|---|
| 6,253,264 B1 | 6/2001 | Sebastian | |
| 6,339,787 B1 | 1/2002 | Yohe et al. | |
| 6,578,073 B1 | 6/2003 | Starnes et al. | |
| 6,701,316 B1 | 3/2004 | Li | |
| 6,879,808 B1 | 4/2005 | Nations et al. | |
| 6,976,090 B2* | 12/2005 | Ben-Shaul et al. | 709/246 |
| 6,993,591 B1 | 1/2006 | Klemm | |
| 7,124,305 B2 | 10/2006 | Margolus et al. | |
| 7,130,890 B1 | 10/2006 | Kumar et al. | |
| 7,133,369 B1* | 11/2006 | Kennamer et al. | 370/254 |
| 7,340,510 B1 | 3/2008 | Liskov et al. | |
| 7,359,395 B2* | 4/2008 | Toporek et al. | 370/401 |
| 7,359,956 B2 | 4/2008 | Kanai et al. | |
| 7,430,331 B2 | 9/2008 | Singh | |
| 7,509,667 B1 | 3/2009 | Cook | |
| 7,636,767 B2 | 12/2009 | Lev-Ran et al. | |
| 7,676,570 B2* | 3/2010 | Levy et al. | 709/224 |
| 7,680,897 B1 | 3/2010 | Carter | |
| 7,681,032 B2 | 3/2010 | Peled et al. | |
| 7,711,797 B1* | 5/2010 | Huang | 709/218 |
| 7,716,367 B1 | 5/2010 | Leighton et al. | |
| 7,778,438 B2 | 8/2010 | Malone | |
| 7,814,149 B1 | 10/2010 | Stringham | |
| 7,836,177 B2 | 11/2010 | Kasriel et al. | |
| 7,917,531 B2 | 3/2011 | Sakurai | |
| 7,941,409 B2 | 5/2011 | Mimatsu | |
| 7,941,609 B2 | 5/2011 | Almog | |
| 7,953,881 B1 | 5/2011 | Vadlakonda et al. | |
| 7,975,019 B1 | 7/2011 | Green et al. | |
| 7,975,071 B2 | 7/2011 | Ramjee et al. | |
| 7,984,112 B2* | 7/2011 | Huang | 709/218 |
| 8,032,586 B2* | 10/2011 | Challenger et al. | 709/203 |
| 8,041,677 B2 | 10/2011 | Sumner et al. | |
| 8,055,616 B2 | 11/2011 | Johnston et al. | |
| 8,082,228 B2 | 12/2011 | Mu | |
| 8,099,492 B2* | 1/2012 | Dahlin et al. | 709/224 |
| 8,151,004 B1 | 4/2012 | Ufimtsev et al. | |
| 8,230,059 B1 | 7/2012 | Santos et al. | |
| 8,230,461 B1 | 7/2012 | Ledermann et al. | |
| 8,284,773 B1 | 10/2012 | Woleben et al. | |
| 8,327,440 B2 | 12/2012 | Milener et al. | |
| 2001/0016836 A1 | 8/2001 | Boccon-Gibod | |
| 2001/0043600 A1 | 11/2001 | Chatterjee et al. | |
| 2001/0051927 A1 | 12/2001 | London et al. | |
| 2002/0006116 A1 | 1/2002 | Burkhart | |
| 2002/0010761 A1 | 1/2002 | Carneal et al. | |
| 2002/0026478 A1 | 2/2002 | Rodgers et al. | |
| 2002/0026560 A1* | 2/2002 | Jordan et al. | 711/120 |
| 2002/0111992 A1* | 8/2002 | Copeland et al. | 709/203 |
| 2002/0116474 A1* | 8/2002 | Copeland et al. | 709/219 |
| 2002/0154887 A1 | 10/2002 | Lu | |
| 2002/0188735 A1 | 12/2002 | Needham et al. | |
| 2002/0194473 A1 | 12/2002 | Pope | |
| 2003/0018581 A1 | 1/2003 | Bratton | |
| 2003/0105833 A1 | 6/2003 | Daniels et al. | |
| 2004/0205149 A1 | 10/2004 | Dillon et al. | |
| 2005/0010870 A1 | 1/2005 | Gu et al. | |
| 2005/0033747 A1 | 2/2005 | Wittkotter | |
| 2005/0044242 A1 | 2/2005 | Stevens et al. | |
| 2005/0131903 A1 | 6/2005 | Margolus et al. | |
| 2006/0101514 A1 | 5/2006 | Milener et al. | |
| 2006/0112264 A1 | 5/2006 | Agarwal | |
| 2006/0184960 A1 | 8/2006 | Horton et al. | |
| 2006/0253444 A1 | 11/2006 | O'Toole et al. | |
| 2006/0277257 A1 | 12/2006 | Kromann et al. | |
| 2006/0288072 A1 | 12/2006 | Knapp et al. | |
| 2007/0033408 A1 | 2/2007 | Morten | |
| 2007/0101074 A1 | 5/2007 | Patterson | |
| 2007/0111713 A1 | 5/2007 | Silverbrook et al. | |
| 2007/0116151 A1 | 5/2007 | Thesling | |
| 2007/0133554 A1 | 6/2007 | Ederer et al. | |
| 2007/0143484 A1 | 6/2007 | Drouet | |
| 2007/0174246 A1 | 7/2007 | Sigurdsson | |
| 2007/0220303 A1 | 9/2007 | Kimura et al. | |
| 2007/0226320 A1 | 9/2007 | Hager et al. | |
| 2007/0256021 A1 | 11/2007 | Prager et al. | |
| 2007/0260653 A1 | 11/2007 | Jaffri et al. | |
| 2007/0288518 A1 | 12/2007 | Crigler et al. | |
| 2008/0005086 A1 | 1/2008 | Moore | |
| 2008/0066182 A1 | 3/2008 | Hickmott et al. | |
| 2008/0082509 A1 | 4/2008 | Bessieres et al. | |
| 2008/0115125 A1 | 5/2008 | Stafford et al. | |
| 2008/0144713 A1 | 6/2008 | Kimmich et al. | |
| 2008/0155614 A1 | 6/2008 | Cooper et al. | |
| 2008/0175239 A1 | 7/2008 | Sistanizadeh et al. | |
| 2008/0205396 A1 | 8/2008 | Dakshinamoorthy et al. | |
| 2008/0235594 A1 | 9/2008 | Bhumkar et al. | |
| 2008/0235739 A1 | 9/2008 | Coebergh Van Den Braak | |
| 2008/0256138 A1 | 10/2008 | Sim-Tang | |
| 2008/0263130 A1 | 10/2008 | Michalowitz et al. | |
| 2009/0006368 A1 | 1/2009 | Mei et al. | |
| 2009/0037393 A1 | 2/2009 | Fredricksen | |
| 2009/0049469 A1 | 2/2009 | Small et al. | |
| 2009/0055471 A1 | 2/2009 | Kozat et al. | |
| 2009/0055862 A1 | 2/2009 | Knoller et al. | |
| 2009/0060086 A1 | 3/2009 | Kimmich et al. | |
| 2009/0100228 A1 | 4/2009 | Lepeska et al. | |
| 2009/0158318 A1 | 6/2009 | Levy | |
| 2009/0168795 A1 | 7/2009 | Segel | |
| 2009/0187673 A1 | 7/2009 | Ramjee et al. | |
| 2009/0234809 A1 | 9/2009 | Bluger et al. | |
| 2009/0313329 A1 | 12/2009 | Agrawal et al. | |
| 2010/0058430 A1 | 3/2010 | Jones et al. | |
| 2010/0083322 A1 | 4/2010 | Rouse | |
| 2010/0177642 A1 | 7/2010 | Sebastian et al. | |
| 2010/0179984 A1 | 7/2010 | Sebastian | |
| 2010/0179986 A1 | 7/2010 | Sebastian et al. | |
| 2010/0179987 A1 | 7/2010 | Sebastian et al. | |
| 2010/0180046 A1 | 7/2010 | Sebastian et al. | |
| 2010/0185730 A1 | 7/2010 | Sebastian | |
| 2010/0232431 A1 | 9/2010 | Sebastian | |
| 2011/0270959 A1 | 11/2011 | Schlusser et al. | |
| 2012/0060121 A1 | 3/2012 | Goldberg et al. | |
| 2012/0185505 A1 | 7/2012 | Borden et al. | |

FOREIGN PATENT DOCUMENTS

| | | |
|---|---|---|
| WO | WO-02/41527 A1 | 5/2002 |
| WO | WO-2007/051079 A2 | 5/2007 |
| WO | WO-2008/070614 A2 | 6/2008 |

OTHER PUBLICATIONS

Paul et al., "Distributed caching with centralized control," Computer Communications, vol. 24, Issue 2, Feb. 1, 2001, pp. 256-268.

Selvakumar et al., "Implementation and comparison of distributed caching schemes," Computer Communications, vol. 24, Issues 7-8, Apr. 1, 2001, pp. 677-684.

* cited by examiner

Figure 10: Update Root Model

Figure 12: Update Node State

Figure 13: Handle Redirection

STATIC TRACKER

CROSS-REFERENCES TO RELATED APPLICATIONS

This application claims the benefit of and is a non-provisional of U.S. Provisional Application Ser. No. 61/325,341 filed on Apr. 18, 2010 entitled "SELECTIVE PREFETCH SCANNING", U.S. Provisional Application Ser. No. 61/325,344 filed on Apr. 18, 2010 entitled "PREFETCHING WITH DYNAMIC FEEDBACK", and U.S. Provisional Application Ser. No. 61/325,342 filed on Apr. 18, 2010 entitled "WEB HIERARCHY MODELING", which are hereby expressly incorporated by reference in their entirety for all purposes.

BACKGROUND

HTTP prefetching typically involves pre-requesting content on behalf of a client or browser before any request for that content is actually generated. When content is prefetched it may become possible to satisfy the request for that content locally (with regard to the client or browser), thereby negating the need to transmit the request and wait for the response. For example, in cases where there exists high latency between the client generating the request and the server which responds with the context requested, each negated request/response may avoid the penalty for such latency, thereby potentially reducing the total time required to satisfy the entire series of requests for the client. This may result in an accelerated end user experience.

In a prefetching system, the system may have a set of metrics for determining when a file should or should not be prefetched. An ideal goal of a prefetcher may be to identify and prefetch all objects relating to a particular requested webpage, and to avoid prefetching objects which are not later requested by a user. For example, when a user requests a web page, the prefetcher may request (e.g., as a proxy for the user) various objects embedded in the webpage in anticipation of those objects being ultimately requested. Under certain circumstances, however, incorrect objects may be prefetched repeatedly based on incorrect models or difficult to quantify exceptions to a rule, resulting in resources being wasted to prefetch an object that will never be used. In certain cases, a prefetcher may miss objects that are embedded in a web page, and it may be difficult to determine which objects associated with a web page will ultimately be requested, or how an object seen at a proxy server relates to other objects. Such circumstances may result in slower performance and increased wait time for a user while a system fetches an object that was missed by a prefetcher.

BRIEF SUMMARY

Multiple non-limiting embodiments are presented which describe systems and methods for static performance tracking of a prefetching system, and for systems and methods of implementing embodiments of a static tracker. In such systems a user typically requests an object from a content server. The first object requested may have additional embedded objects or children that will later be requested by the user after the first object is received. A proxy server that scans the response may identify child objects that will later be requested by the user from information obtained in the scan. In some circumstances, however, some child objects may be missed, or the system may fail to by incorrectly identifying an object as a child object. When a child is missed by the prefetcher, a user experiences slower response times, and when the system fails and a child is misidentified and incorrectly prefetched, system resources are wasted. A static tracker may track successes, misses, and failures in order to correct misses and failures that may otherwise be repeated indefinitely.

In one potential non-limiting embodiment, systems and methods are described involving scanning a response to a first HTTP request for a web page in order to identify a web object for prefetching. After the response is scanned a web object may be prefetched to a proxy server prior to a browser requesting the web object. The proxy server may observe a plurality of child HTTP requests that are associated with the response to the first HTTP request for the web page and measure the success of the prefetching based on whether the web object was prefetched and whether the web object was later requested by the browser. After success is measured for the specific instance of the web object and the web page, a success rate for prefetching or not prefetching the web object as associated with the web page is updated. In certain embodiments, the method may include deciding, based on the success rate for the web object as associated with the web page subsequent to the scanning, whether to prefetch the web object based on the success rate. The success rate may be based on multiple scans of the same or similar web pages and related objects Such a system may identify hits, where an object is correctly prefetched; misses, where an object is requested by a user and not prefetched; and mistakes, where an object is prefetched but not requested by a user.

In additional embodiments, the success of the prefetching may be determined by a client computer, a proxy client, or a proxy server. The success may additionally involve time limits within which an object prefetching or decision not to prefetch is considered a success or failure.

Further embodiments may be based not only on specific associations between a web page and a web object, but also on characteristics of the web object. Characteristics may be associated with a bin that also has an associated success or fail rate, such that success rates associated with certain characteristics or sets of characteristics may be identified during a prefetch operation and later taken into account during a decision to prefetch a similar or identical object.

As part of alternative embodiments for any implementation, tracking may be done on a user-specific URL tracking basis or on a universal URL tracking basis, such that tracking data may be aggregated for individual users, groups of users, of all users in one or more servers or server systems. This aggregation may additionally be for web page to web object associations, or for various associations with one or more characteristics taken into account. Specific characteristics such as the number of "fails since success", a "number of successes", and a "number of successes since a failure", among others possible characteristics.

BRIEF DESCRIPTION OF THE DRAWINGS

The present disclosure is described in conjunction with the appended figures.

DETAILED DESCRIPTION

The present invention relates, in general, to network acceleration and, more particularly, to enhancing prefetch with by performing selective prefetch scanning.

Various embodiments described herein relate to systems, apparatus, and methods for substantially reliably modeling a hierarchical object relationship in a hypertext mark-up language (HTML) context. In some embodiments, a determination is made of parentage of content objects being requested over a communications system. Various embodiments use referrers where reliable, supplemented or supplanted by other techniques to model the object hierarchies. In one potential embodiment, several candidates are identified as potential root nodes for a requested HTTP object. Some candidates may be excluded based on their characteristics, and a most likely candidate is established as root node. After the likely candidate is established as the root, the children of the established root may be prefetched. In additional embodiments, a success rate or some other feedback mechanism may be used to improve performance and impact the likelihoods for various candidates to be established as the root node.

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below and, while various features are ascribed to different embodiments, it should be appreciated that the features described with respect to one embodiment may be incorporated with another embodiment as well. By the same token, however, no single feature or features of any described embodiment should be considered essential to the invention, as other embodiments of the invention may omit such features.

Figure 1:
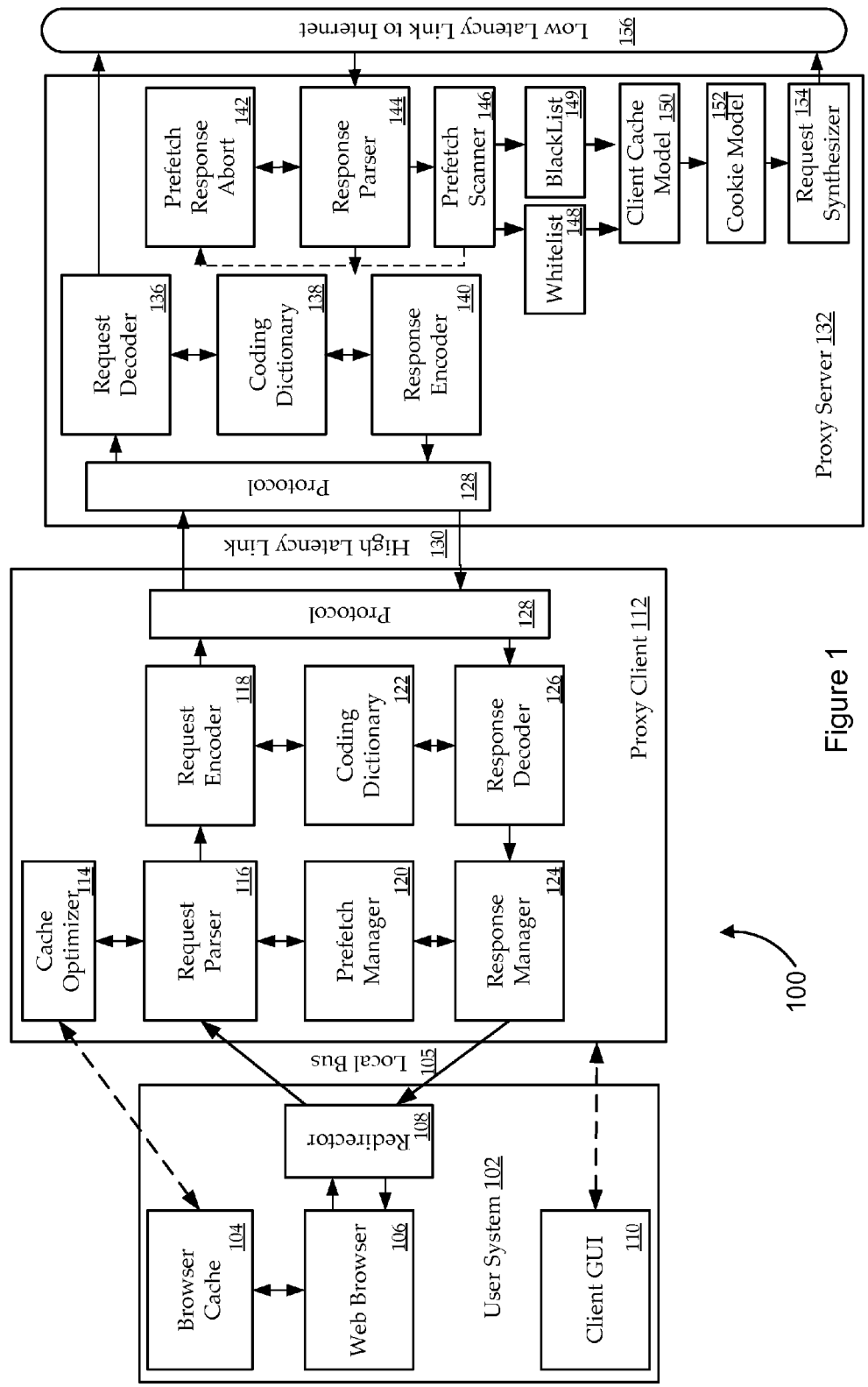
FIG. 1 illustrates a block diagram of one potential implementation of a proxy server and client in a communications system in accordance with one potential embodiment of the innovations presented herein.

Turning now to FIG. 1, a system 100 for optimizing transfer of content from the Internet to a web browser is illustrated. In one embodiment, the system may include a user system 102, a proxy client 112, and a proxy server 132. The user system 102 may include a client graphical user interface (GUI) 110. Client GUI 110 may allow a user to configure performance aspects of the system 100. For example, the user may adjust the compression parameters and/or algorithms, content filters (e.g., blocks elicit websites), and enable or disable various features used by the system 100. In one embodiment, some of the features may include network diagnostics, error reporting, as well as controlling, for example, prefetch response abort 142. Such control may be adding and/or removing pages (i.e. URLs) to or from whitelist 148 and/or blacklist 149.

In one embodiment, the user selects a universal recourse locator (URL) address which directs web browser 106 (e.g., Internet Explorer®, Firefox®, Netscape Navigator®, etc.) to a website (e.g., cnn.com, google.com, yahoo.com, etc.). In a further embodiment, web browser 106 may check browser cache 104 to determine whether the website associated with the selected URL is located within browser cache 104. If the website is located within browser cache 104, the amount of time the website has been in the cache is checked to determine if the cached website is "fresh" (i.e., new) enough to use. For example, the amount of time that a website may be considered fresh may be 5 minutes; however, other time limits may be used. Consequently, if the website has been cached and the website is considered fresh, then web browser 106 renders the cached page. However, if the website has either not been cached or the cached webpage is not fresh, web browser 106 sends a request to the Internet for the website.

In one embodiment, redirector 108 intercepts the request sent from web browser 106. Redirector 108 instead sends the request through a local bus 105 to proxy client 112. In some embodiments, proxy client 112 may be implemented as a software application running on user system 102. In an alternative embodiment, proxy client 112 may be implemented on a separate computer system and is connected to user system 102 via a high speed/low latency link (e.g., a branch office LAN subnet, etc.). In one embodiment, proxy client 112 includes a request parser 116. Request parser 116 may check cache optimizer 114 to determine if a cached copy of the requested website may still be able to be used. Cache optimizer 114 is in communication with browser cache 104 in order to have access to cached websites. Cache optimizer 114 is able to access browser cache 104 without creating a redundant copy of the cached websites, thus requiring less storage space.

According to one embodiment, cache optimizer 114 implements more effective algorithms to determine whether a cached website is fresh. In one embodiment, cache optimizer 114 may implement the cache expiration algorithms from HTTP v1.1 (i.e., RFC 2616), which may not be natively supported in web browser 106. For example, browser cache 104 may inappropriately consider a cached website as too old to use; however, cache optimizer 114 may still be able to use the cached website. More efficient use of cached websites can improve browsing efficiency by reducing the number of Internet accesses.

In one embodiment, if the requested website is not able to be accessed from the cached websites, request parser 116 checks prefetch manager 120 to determine if the requested website has been prefetched. Prefetching a website is when content from the website is accessed, downloaded, and stored before a request to the website is made by web browser 106. Prefetching can potentially save round-trips of data access from user system 102 to the Internet.

In a further embodiment, if the requested website has not been prefetched, then request parser 116 forwards the request to a request encoder 118. Request encoder 118 encodes the request into a compressed version of the request using one of many possible data compression algorithms. For example, these algorithms may employ a coding dictionary 122 which stores strings so that data from previous web objects can be used to compress data from new pages. Accordingly, where the request for the website is 550 bytes in total, the encoded request may be as small as 50 bytes. This level of compression can save bandwidth on a connection, such as high latency link 130. In one embodiment, high latency link 130 may be a wireless link, a cellular link, a satellite link, a dial-up link, etc.

In one embodiment, after request encoder 118 generates an encoded version of the request, the encoded request is forwarded to a protocol 128. In one embodiment, protocol 128 is Intelligent Compression Technology's® (ICT) transport protocol (ITP). Nonetheless, other protocols may be used, such as the standard transmission control protocol (TCP). In one embodiment, ITP maintains a persistent connection with proxy server 132. The persistent connection between proxy client 112 and proxy server 132 enables system 100 to eliminate the inefficiencies and overhead costs associated with creating a new connection for each request.

In one embodiment, the encoded request is forwarded from protocol 128 to request decoder 136. Request decoder 136 uses a decoder which is appropriate for the encoding performed by request encoder 118. In one embodiment, this process utilizes a coding dictionary 138 in order to translate the encoded request back into a standard format which can be accessed by the destination website. Furthermore, if the HTTP request includes a cookie (or other special instructions), such as a "referred by" or type of encoding accepted, information about the cookie or instructions may be stored in a cookie model 152. Request decoder 136 then transmits the decoded request to the destination website over a low latency link 156. Low latency link 156 may be, for example, a cable modem connection, a digital subscriber line (DSL) connection, a T1 connection, a fiber optic connection, etc.

In response to the request, a response parser 144 receives a response from the requested website. In one embodiment, this response may include an attachment, such as an image and/or text file. Some types of attachments, such as HTML, XML, CSS, or Java Scripts, may include references to other "in-line" objects that may be needed to render a requested web page. In one embodiment, when response parser 144 detects an attachment type that may contain such references to "in-line" objects, response parser 144 may forward the objects to a prefetch scanner 146.

In one embodiment, prefetch scanner 146 scans the attached file and identifies URLs of in-line objects that may be candidates for prefetching. For example, candidates may be identified by HTML syntax, such as the token "img src=". In addition, objects that may be needed for the web page may also be specified in java scripts that appear within the HTML or CSS page or within a separate java script file. Methods for identifying candidates within Java scripts may be found in a co-pending U.S. patent application Ser. No. 12/172,917, now U.S. Pat. No. 8,549,099, entitled, "METHODS AND SYSTEMS FOR JAVA SCRIPT PARSING", which is incorporated by reference for any and all purposes.

In one embodiment, for the candidate URLs, prefetch scanner 146 may notify prefetch response abort 142 of the context in which the object was identified, such as the type of object in which it was found and/or the syntax in which the URL occurred. This information may be used by prefetch response abort 142 to determine the probability that the URL will actually be requested by web browser 106.

According to a further embodiment, the candidate list is forwarded to whitelist 148 and blacklist 149. Whitelist 148 and blacklist 149 may be used to track which URLs should be allowed to be prefetched. Based on the host (i.e., the server that is supplying the URL), the file type (e.g., application service provider (ASP) files should not be prefetched), etc. Accordingly, whitelist 148 and blacklist 149 control prefetching behavior by indicating which URLs on the candidate list should or should not be prefetched. In many instances with certain webpages/file types, prefetching may not work. In addition to ASP files, webpages which include fields or cookies may have problems with prefetching.

In one embodiment, once the candidate list has been passed through whitelist 148 and blacklist 149, a modified candidate list is generated and then the list is forwarded to a client cache model 150. The client cache model 150 attempts to model which items from the list will be included in browser cache 104. As such, those items are removed from the modified candidate list. Subsequently, the updated modified candidate list is forwarded to a request synthesizer 154 which creates an HTTP request in order to prefetch each item in the updated modified candidate list. The HTTP request header may include cookies and/or other instructions appropriate to the website and/or to web browser 106's preferences using information obtained from cookie model 152. The prefetch HTTP requests may then be transmitted through low latency link 156 to the corresponding website.

In one embodiment, response parser 144 receives a prefetch response from the website and accesses a prefetch response abort 142. Prefetch response abort 142 is configured to determine whether the prefetched item is worth sending to user system 102. Prefetch response abort 142 bases its decision whether to abort a prefetch on a variety of factors, which are discussed below in more detail.

If the prefetch is not aborted, response parser 144 forwards the response to response encoder 140. Response encoder 140 accesses coding dictionary 138 in order to encode the prefetched response. Response encoder 140 then forwards the encoded response through protocol 128 over high latency link 130 and then to response decoder 126. Response decoder 126 decodes the response and forwards the response to response manager 124. In one embodiment, if the response is a prefetched response, then response manager 124 creates a prefetch socket to receive the prefetched item as it is downloaded.

Response manager 124 transmits the response over local bus 105 to redirector 108. Redirector 108 then forwards the response to web browser 106 which renders the content of the response.

Figure 2:
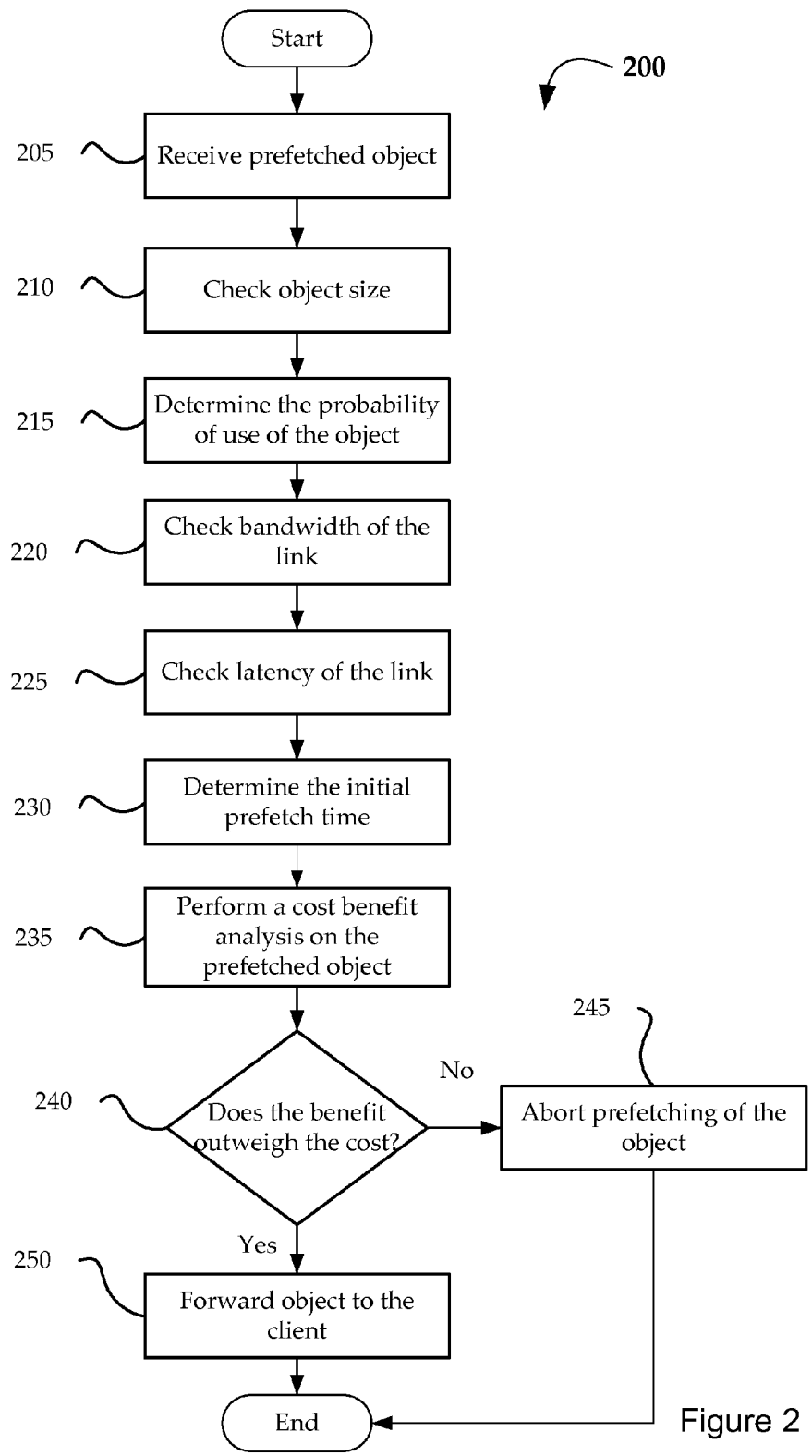
FIG. 2 shows a chart including a decision tree in accordance with one aspect of the innovations presented herein.

Turning now to FIG. 2, which illustrates method 200, one embodiment of the operations performed by prefetch response abort 142 (FIG. 1) is shown. As discussed above, prefetch response abort 142 (FIG. 1) receives a prefetched object from the Internet through low latency link 156 (FIG. 1) (process block 205). Even though the object has initially been prefetched, it does not necessarily mean that it is efficient to forward the object to the client (e.g., proxy client 112 (FIG. 1)). Due to bandwidth and other constraints of the link, objects sent over high latency link 130 (FIG. 1) between proxy server 132 (FIG. 1) and proxy client 112 (FIG. 1) should be carefully selected. Accordingly, a variety of factors should be considered before forwarding a prefetched object to the client.

At process block 210, the size of the received object is checked. In one embodiment, the size of the object may be significant in determining whether to forward the object to the client. For example, one benefit of forwarding the prefetched object to the client may be the elimination of a round trip. In other words, if a prefetched item is eventually used by user system 102 (FIG. 1), the request out to the Internet and the response back from the requested website (i.e., one round trip) can be eliminated. Hence, in some instances, the smaller the prefetched object is, the more beneficial the prefetch is for optimization purposes.

Furthermore, one potential negative effect of forwarding a prefetched object is that the prefetched object unnecessarily uses the link's bandwidth. As such, if a prefetched object is forwarded to the client but never used by the client, the bandwidth used to forward the object may be wasted. Accordingly, larger prefetched objects may decrease optimization because the gained round trip may not outweigh the bandwidth consumption. In one embodiment, a point system may be assigned to the prefetched object where, for example, a 10 kilobyte object is given a higher point value than a 10 megabyte object. Consequently, if the point value associated with the object reaches or exceeds a threshold, then the object is forwarded to the client.

Another factor in determining whether an object should be forwarded to the client is the probability of use of the object (process block 215). As a user browses the Internet, not all URLs that are prefetched will actually be requested by web browser 106. The user may, for example, "click-off" a web page before objects within the page are requested. Whether some objects may be requested may depend on browser settings and/or on external events, such as mouse position. Furthermore, objects referenced on a CSS (e.g., style sheet for the entire website) may not be used on each individual web page. In addition, if URLs are identified within Java scripts, the scripts themselves, based on a variety of factors, may determine whether to request an object.

In one embodiment, the probability that an object will actually be requested by web browser 106 may be estimated as a function of the context in which the reference was identified. For example, this context may depend on the type of the object (e.g., HTML, CSS, JS, etc.), the surrounding syntax (e.g., "img src=", java script, etc.), and the level of recursion (e.g., was the reference on the main HTML or on an object that was itself prefetched). In one embodiment, if the object was referenced in a Java script, the probability of use may depend on information collected while parsing the script. The probability that an object in a specific context will be requested can be estimated in several ways. For example, a general model can be built sampling many different clients in many sessions going to many websites. Subsequently, a more specific model can be developed for a specific website and/or for a particular user. In one embodiment, this may be accomplished by recording the frequency of page use in a specific context for a specific web page by a specific user.

Collectively, based on the above-mentioned probability factors, the object may be assigned a point value associated with its probability of use. In an alternative embodiment, the probability of use may be assigned a percentage value.

At process block 220, the bandwidth of high latency link 130 (FIG. 1) may be determined (i.e., the speed of the link between proxy server 132 (FIG. 1) and proxy client 112 (FIG. 1)). The bandwidth of this link can be a factor in determining whether to forward the prefetched object. For example, with a higher link bandwidth, more objects and larger objects could be forwarded to the client. However, in contrast, if the bandwidth of the link is lower, then prefetch response abort 142 (FIG. 1) may be more selective when deciding whether to forward the prefetched object. In one embodiment, the bandwidth of the link is assigned a point value which may be factored into the determination of whether to forward the object.

At process block 225, the latency of the link between proxy server 132 (FIG. 1) and proxy client 112 (FIG. 1) is determined. In one embodiment, the latency of the link is based on the current round trip time (RTT) of the link. Accordingly, if the RTT is high, then it may be more beneficial to forward the prefetched object to the client because of the round trip savings gained by forwarding the object. However, if the RTT is low, then the saved round trip may be of less value for optimization purposes. In one embodiment, the latency of the link is assigned a point value which may be factored into the determination of whether to forward the object.

In process block 230, the initial prefetch time is determined (i.e., how long the object took to be retrieved from the Internet). If the object took a long time to retrieve from the Internet, then it may be optimal to forward the object to the client in order to avoid re-downloading the object in the future. Furthermore, if the object was downloaded quickly, then less optimization may be gained from forwarding the object to the client. Hence, in one embodiment, the download time of the object may be assigned a point value which may be factored into determining whether to forward the object to the client. In an alternative embodiment, the aborted objects may be stored on proxy server 132 (FIG. 1) in case they are subsequently requested. Accordingly, if these objects are stored and then requested, the download will not need to be repeated. If this approach is implemented, then process block 230 may not be used.

At process block 235, a cost/benefit analysis may be preformed to determine whether to forward the prefetched object. In one embodiment, the above-mentioned point values may be calculated to determine if the object meets a predetermined threshold. In an alternative embodiment, the cost of forwarding the object may be determined using the following equation:

$$Cost = ObjectSize * (1.0 - ProbabilityofUse) / Bandwidth$$

Furthermore, in one embodiment, the benefit of forwarding the prefetched object may be determined using the following equation:

$$Benefit = ProbabilityofUse * (RTT + PrefetchTime)$$

Accordingly, by using these or other equations, at decision block 240, if the cost value is greater than the benefit value, then the prefetched object is aborted and the object is not forwarded to the client (process block 245). Conversely, if the benefit is greater than the cost, then the prefetched object is forwarded to the client (process block 250). In an alternative embodiment, objects that have been aborted may be cached at, for example, proxy server 132 (FIG. 1), in the event that the client subsequently requests the object. Hence, the above referenced equation may be reduced to:

$$Benefit = ProbabilityofUse * RTT$$

The equation is reduced in this manner because, since the object has already been downloaded, it would not need to be re-downloaded from the originating server.

A number of variations and modifications of the disclosed embodiments can also be used. For example, the factors used to determine whether to forward a prefetched object may be used outside the website and/or Internet context. For example, the prefetching technique may be used to determine which terminals to download an object from in a peer-to-peer network environment. In addition, the prefetching technique may be used on various network types, for example, a satellite network, a mobile device network, etc.

Figure 3:
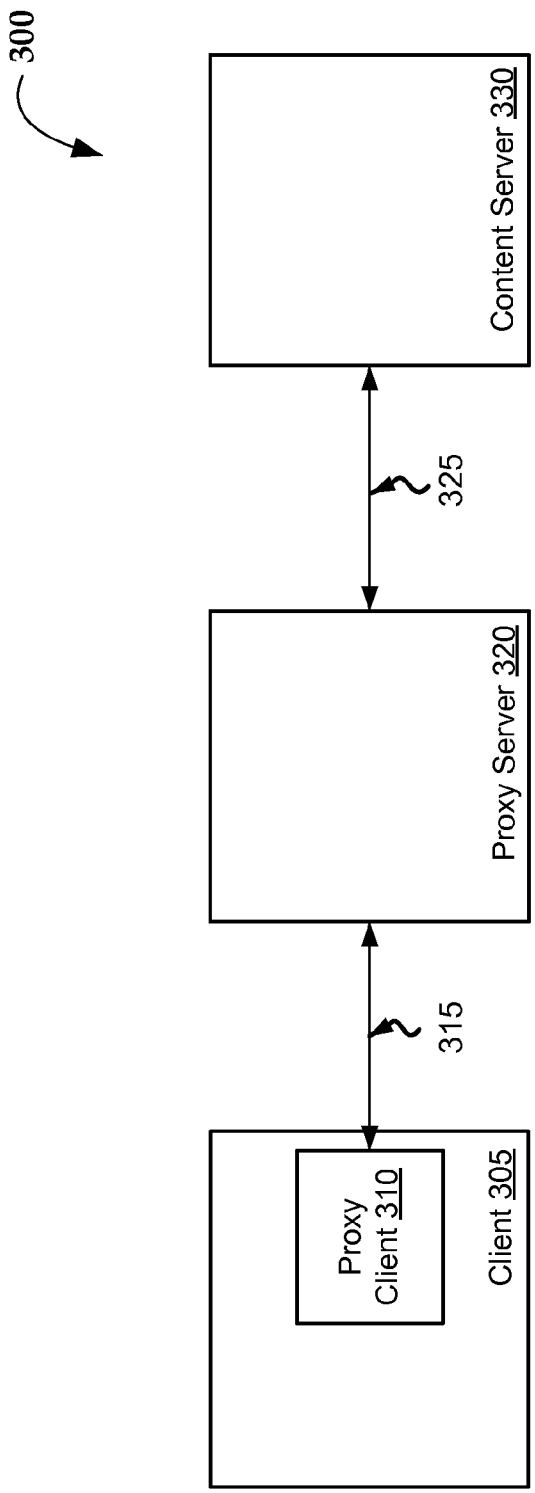
FIG. 3 illustrates an embodiment of a communications system in accordance with one potential embodiment of the innovations presented herein.

Referring now to FIG. 3, a system 300 for providing network acceleration is illustrated. In one embodiment, user system 102 in FIG. 1 may be client 305 and proxy client 112 in FIG. 1 may be proxy client 310. Client 305 may generate a request for content from content server 330. In one embodiment, content server 330 may be a web server, a file server, a mail server, etc., and the content request may be for a file, a webpage, an email message, etc.

Proxy client 310 may be configured to intercept the content request from client 305 and transmit the request over high latency link 315 to proxy server 320 on behalf of client 305. In one embodiment, high latency link 315 may be a satellite link, a cellular link, a wireless link, etc. In one embodiment, the content request may include references to prefetchable content. Accordingly, proxy server 320, while prefetching objects for network acceleration, would utilize the prefetch abort systems and methods described in FIGS. 1 and 2.

In a further embodiment, communications between proxy server 320 and content server 330 over low latency link 325 are sufficiently fast that acceleration is not needed or would not provide sufficient benefit for the cost needed to accelerate. Hence, upon receipt of communications from content server 330, proxy server 320 accelerates the communications between proxy server 320 and proxy client 310 in order to accelerate communications over high latency link 315. Accordingly, the network traffic over high latency link 315 is accelerated while network traffic over low latency link 325 remains relatively unchanged.

Figure 4:
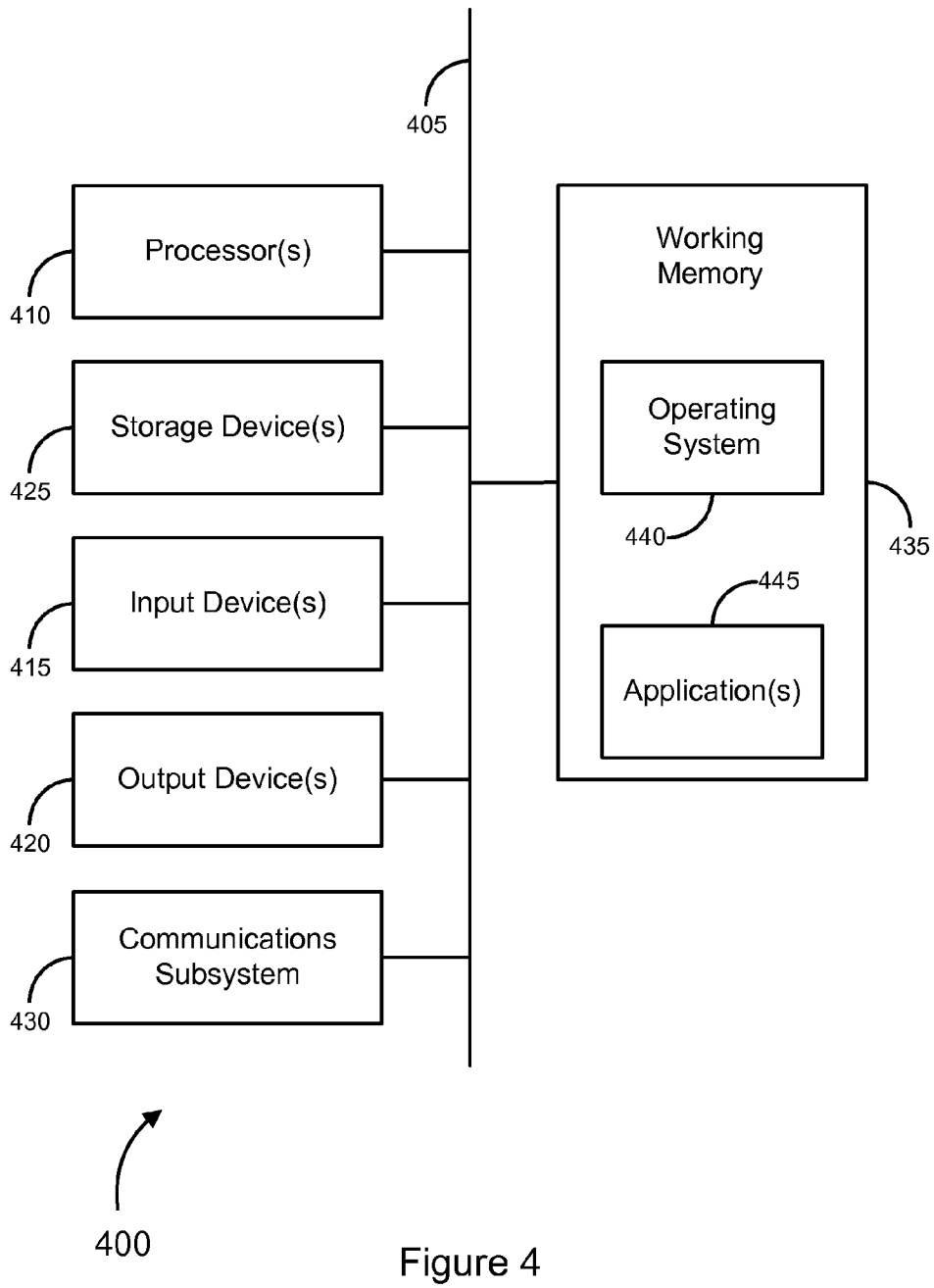
FIG. 4 illustrates one potential embodiment of a computing system or server in accordance with embodiments of the innovations presented herein.

FIG. 4 provides a schematic illustration of one embodiment of a computer system 400 that can perform the methods of the invention, as described herein, and/or can function, for example, as any part of client 305, proxy server 320, or content server 330 in FIG. 3. It should be noted that FIG. 4 is meant only to provide a generalized illustration of various components, any or all of which may be utilized, as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements can include one or more processors 410, including, without limitation, one or more general-purpose processors and/or one or more special-purpose processors (such as digital signal processing chips, graphics acceleration chips, and/or the like); one or more input devices 415, which can include, without limitation, a mouse, a keyboard, and/or the like; and one or more output devices 420, which can include, without limitation, a display device, a printer, and/or the like.

The computer system 400 may further include (and/or be in communication with) one or more storage devices 425, which can comprise, without limitation, local and/or network accessible storage and/or can include, without limitation, a disk drive, a drive array, an optical storage device, a solid-state storage device such as a random access memory ("RAM") and/or a read-only memory ("ROM"), which can be programmable, flash-updateable, and/or the like. The computer system 400 might also include a communications subsystem 430, which can include, without limitation, a modem, a network card (wireless or wired), an infra-red communication device, a wireless communication device, and/or chipset (such as a Bluetooth™ device, an 802.11 device, a WiFi device, a WiMax device, cellular communication facilities, etc.), and/or the like. The communications subsystem 430 may permit data to be exchanged with a network (such as the network described below, to name one example), and/or any other devices described herein. In many embodiments, the computer system 400 will further comprise a working memory 435, which can include a RAM or ROM device, as described above.

The computer system 400 also can comprise software elements, shown as being currently located within the working memory 435, including an operating system 440 and/or other code, such as one or more application programs 445, which may comprise computer programs of the invention, and/or may be designed to implement methods of the invention and/or configure systems of the invention, as described herein. Merely by way of example, one or more procedures described with respect to the method(s) discussed above might be implemented as code and/or instructions executable by a computer (and/or a processor within a computer). A set of these instructions and/or code might be stored on a computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and/or provided in an installation package, such that the storage medium can be used to program a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one aspect, the invention employs a computer system (such as the computer system 400) to perform methods of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another machine-readable medium, such as one or more of the storage device(s) 425. Merely by way of example, execution of the sequences of instructions contained in the working memory 435 might cause the processor(s) 410 to perform one or more procedures of the methods described herein.

The terms "machine-readable medium" and "computer readable medium", as used herein, refer to any medium that participates in providing data that causes a machine to operate in a specific fashion. In an embodiment implemented using the computer system 400, various machine-readable media might be involved in providing instructions/code to processor(s) 410 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) 425. Volatile media includes, without limitation, dynamic memory, such as the working memory 435. Transmission media includes coaxial cables, copper wire, and fiber optics, including the wires that comprise the bus 405, as well as the various components of the communications subsystem 430 (and/or the media by which the communications subsystem 430 provides communication with other devices). Hence, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals, and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc., carried by the signals) to the working memory 435, from which the processor(s) 405 retrieves and executes the instructions. The instructions received by the working memory 435 may optionally be stored on a storage device 425 either before or after execution by the processor(s) 410.

Figure 5:
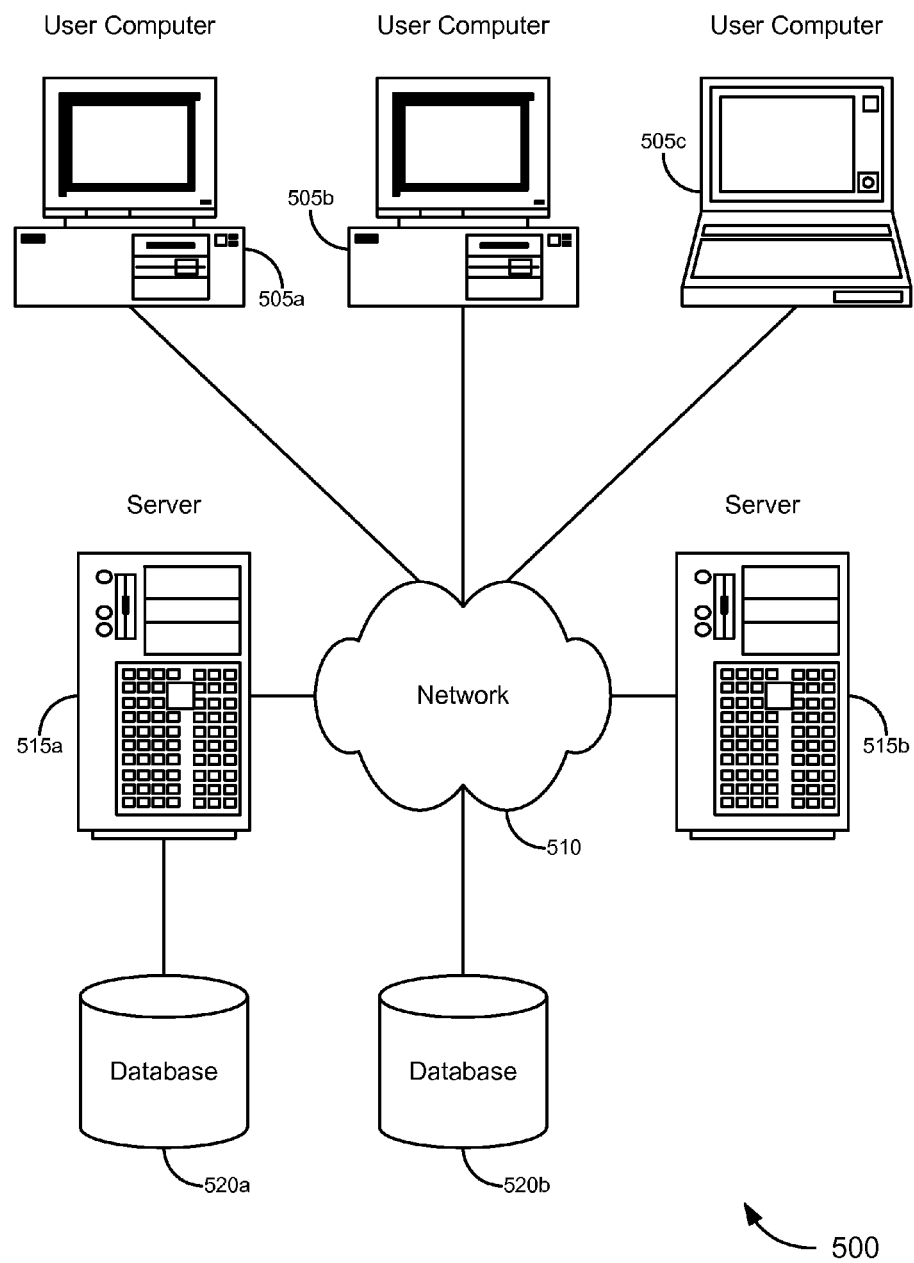
FIG. 5 illustrates one potential implementation of a networked system in accordance with embodiments of the innovations presented herein.

A set of embodiments comprises systems for implementing staged configurator modeling. In one embodiment, proxy server 320 and/or client 305 (as shown in FIG. 3) may be implemented as computer system 400 in FIG. 4. Merely by way of example, FIG. 5 illustrates a schematic diagram of a system 500 that can be used in accordance with one set of embodiments. The system 500 can include one or more user computers 505. The user computers 505 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 505 can also have any of a variety of applications, including one or more applications configured to perform methods of the invention, as well as one or more office applications, database client and/or server applications, and web browser applications. Alternatively, the user computers 505 can be any other electronic device, such as a thin-client computer, Internet-enabled mobile telephone, and/or personal digital assistant (PDA), capable of communicating via a network (e.g., the network 510 described below) and/or displaying and navigating web pages or other types of electronic documents. Although the exemplary system 500 is shown with three user computers 505, any number of user computers can be supported.

Certain embodiments of the invention operate in a networked environment, which can include a network 510. The network 510 can be any type of network familiar to those skilled in the art that can support data communications using any of a variety of commercially-available protocols, including, without limitation, TCP/IP, SNA, IPX, AppleTalk, and the like. Merely by way of example, the network 510 can be a local area network ("LAN"), including, without limitation, an Ethernet network, a Token-Ring network and/or the like; a wide-area network (WAN); a virtual network, including, without limitation, a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks.

Embodiments of the invention can include one or more server computers 515. Each of the server computers 515 may be configured with an operating system, including, without limitation, any of those discussed above, as well as any commercially (or freely) available server operating systems. Each of the servers 515 may also be running one or more applications, which can be configured to provide services to one or more user computers 505 and/or other servers 515.

Merely by way of example, one of the servers 515 may be a web server, which can be used, merely by way of example, to process requests for web pages or other electronic documents from user computers 505. The web server can also run a variety of server applications, including HTTP servers, FTP servers, CGI servers, database servers, Java™ servers, and the like. In some embodiments of the invention, the web server may be configured to serve web pages that can be operated within a web browser on one or more of the user computers 505 to perform methods of the invention.

The server computers 515, in some embodiments, might include one or more application servers, which can include one or more applications accessible by a client running on one or more of the client computers 505 and/or other servers 515. Merely by way of example, the server(s) 515 can be one or more general purpose computers capable of executing programs or scripts in response to the user computers 505 and/or other servers 515, including, without limitation, web applications (which might, in some cases, be configured to perform methods of the invention). Merely by way of example, a web application can be implemented as one or more scripts or programs written in any suitable programming language, such as Java™, C, C#™ or C++, and/or any scripting language, such as Perl, Python, or TCL, as well as combinations of any programming/scripting languages. The application server(s) can also include database servers, including without limitation those commercially available from Oracle™, Microsoft™, Sybase™, IBM™, and the like, which can process requests from clients (including, depending on the configurator, database clients, API clients, web browsers, etc.) running on a user computer 505 and/or another server 515. In some embodiments, an application server can create web pages dynamically for displaying the information in accordance with embodiments of the invention, such as information displayed on web browser 106 in FIG. 1. Data provided by an application server may be formatted as web pages (comprising HTML, Javascript, etc., for example) and/or may be forwarded to a user computer 505 via a web server (as described above, for example). Similarly, a web server might receive web page requests and/or input data from a user computer 505 and/or forward the web page requests and/or input data to an application server. In some cases a web server may be integrated with an application server.

In accordance with further embodiments, one or more servers 515 can function as a file server and/or can include one or more of the files (e.g., application code, data files, etc.) necessary to implement methods of the invention incorporated by an application running on a user computer 505 and/or another server 515. Alternatively, as those skilled in the art will appreciate, a file server can include all necessary files, allowing such an application to be invoked remotely by a user computer 505 and/or server 515. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520. The location of the database(s) 520 is discretionary: merely by way of example, a database 520a might reside on a storage medium local to (and/or resident in) a server 515a (and/or a user computer 505). Alternatively, a database 520b can be remote from any or all of the computers 505 or servers 515, so long as the database 520b can be in communication (e.g., via the network 510) with one or more of these. In a particular set of embodiments, a database 520 can reside in a storage-area network ("SAN") familiar to those skilled in the art. (Likewise, any necessary files for performing the functions attributed to the computers 505 or servers 515 can be stored locally on the respective computer and/or remotely, as appropriate.) In one set of embodiments, the database 520 can be a relational database, such as an Oracle™ database, that is adapted to store, update, and retrieve data in response to SQL-formatted commands. The database might be controlled and/or maintained by a database server, as described above, for example.

Prefetch Scanner and Tracker Embodiments

Figure 6:
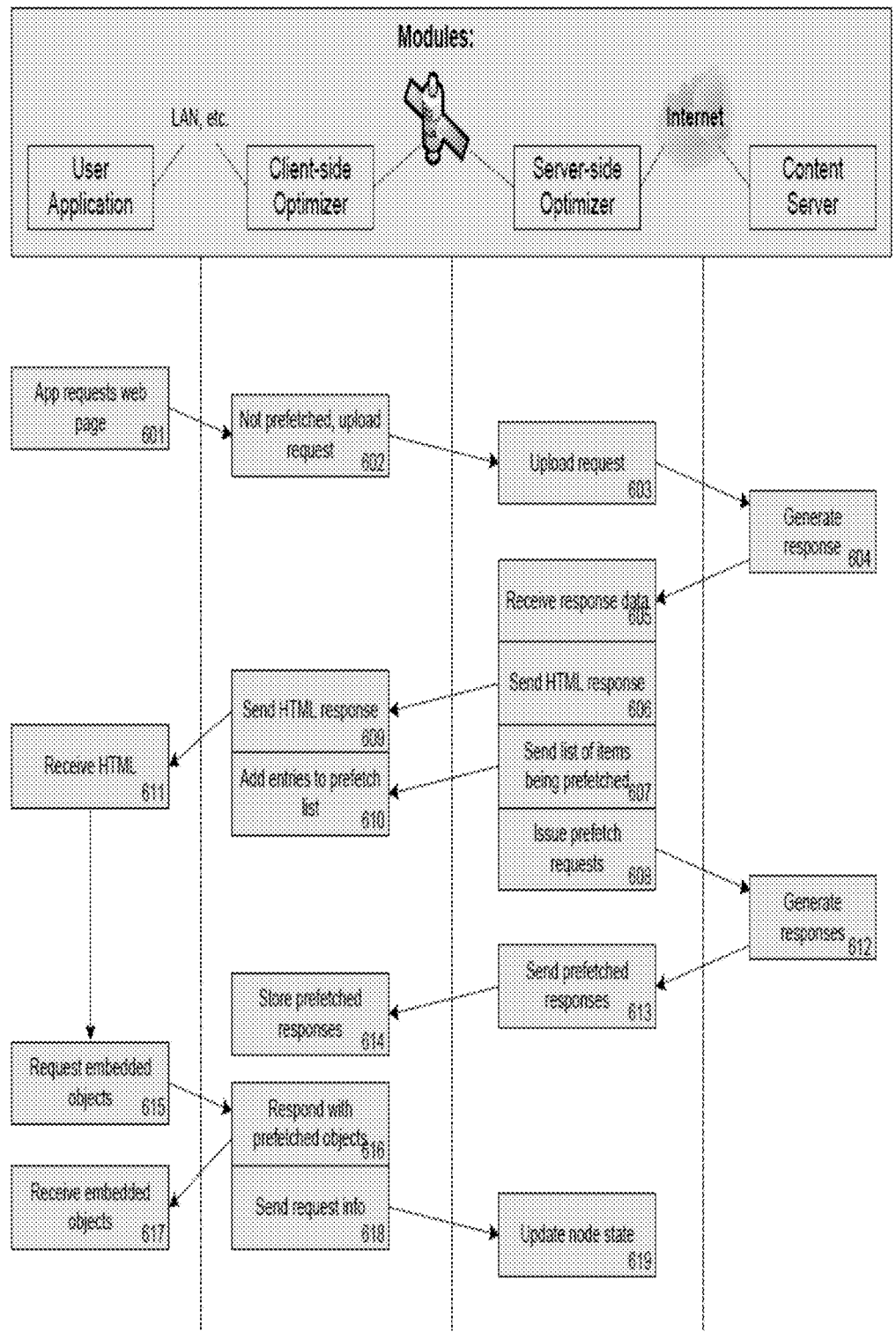
FIG. 6 illustrates one potential implementation of data flow during prefetching in accordance with embodiments of the innovations presented herein.

FIG. 6 shows an illustrative data flow 600 during prefetching, according to various embodiments. The user application may be a web browser or any application using HTTP. The client side optimizer may be (a) software running on the same machine as the user application; (b) embedded in the modem or user terminal providing the interface to a satellite link; or (c) in another device on the user side of the satellite link. The satellite link may represent any network with high latency (or high apparent latency), which may cause web applications to perform poorly. The server side optimizer can be placed anywhere on the Internet-facing side of the high latency link. The content server may be any server supporting an HTTP application.

A web page download might begin with the user requesting a URL [601], such as "www.cnn.com\" which asks the content server to deliver the default page associated with this domain. This request is intercepted [602] by the client optimizer, which checks whether a prefetched response is available. Since this is the first request, no prefetched response is available, and the request is uploaded to the server-side optimizer [603], which forwards it to the content server [604]. The content server delivers back a response, which might be an HTML file that specifies the construction of the web page using images, style sheets, and other types of files.

The server side optimizer receives this response [605] and processes it using various modules to be described in subsequent paragraphs. When finished, it sends the response [606] to the client side optimizer along with a list of items that will be prefetched [607]. Then it issues requests for these prefetched items to one or more content servers [608]. The client optimizer receives the HTML file and forwards it [609] to the user application. It adds the list of prefetched items to a list it maintains of items being prefetched [610].

At the same time, the content server(s) receives the prefetched requests [612] and downloads responses to each. The server-side optimizer receives these objects [613] and begins forwarding them to the client-side optimizer. The client-side optimizer may store these [614] responses in anticipation of future requests, or deliver them to requests that are already pending.

The user application receives the initial HTML page [611] and parses it. It then requests the images, style sheets, scripts, and other objects needed to render the page or otherwise utilize the content [615]. The client-side optimizer intercepts these requests and checks whether these objects are on the list of items that are being prefetched or have already arrived as a result of prefetching [616]. When an application request can be fulfilled using prefetched data, the response can be returned to the client [617] without requiring a roundtrip across the high-latency link. This elimination of a round trip time (RTT) improves application performance and the success of a prefetching system is a function of its ability to reduce these roundtrips.

If the client-side optimizer fulfills a client request, it provides an update message to the server-side optimizer [618]. This message is then used on the server to update various models [619] as will be described subsequently. This message may provide various types of data about the application request, such as the time it arrived relative to other requests and cookies that were supplied. Because the message is intended to improve prefetching performance on subsequent requests, its upload may be placed on a lower priority queue, bundled with other messages, or otherwise handled to reduce the load on the return link due to this traffic.

It will be appreciated that other optimizations may be included for further enhance prefetch performance. For example, certain types of data compression to reduce bandwidth requirements may be used. Some of these and/or other techniques are described in U.S. patent application Ser. No. 12/172,913, titled "METHODS AND SYSTEMS FOR PERFORMING A PREFETCH ABORT OPERATION," filed on Jul. 14, 2008; U.S. patent application Ser. No. 12/252,181, titled "METHODS AND SYSTEMS FOR IMPLEMENTING A CACHE MODEL IN A PREFETCHING SYSTEM," filed on Oct. 15, 2008; and U.S. patent application Ser. No. 12/477,814, titled "METHODS AND SYSTEMS FOR UTILIZING DELTA CODING IN ACCELERATION PROXY SERVERS," filed on Jun. 3, 2009, all of which are hereby incorporated by reference herein for any and all purposes.

Figure 7:
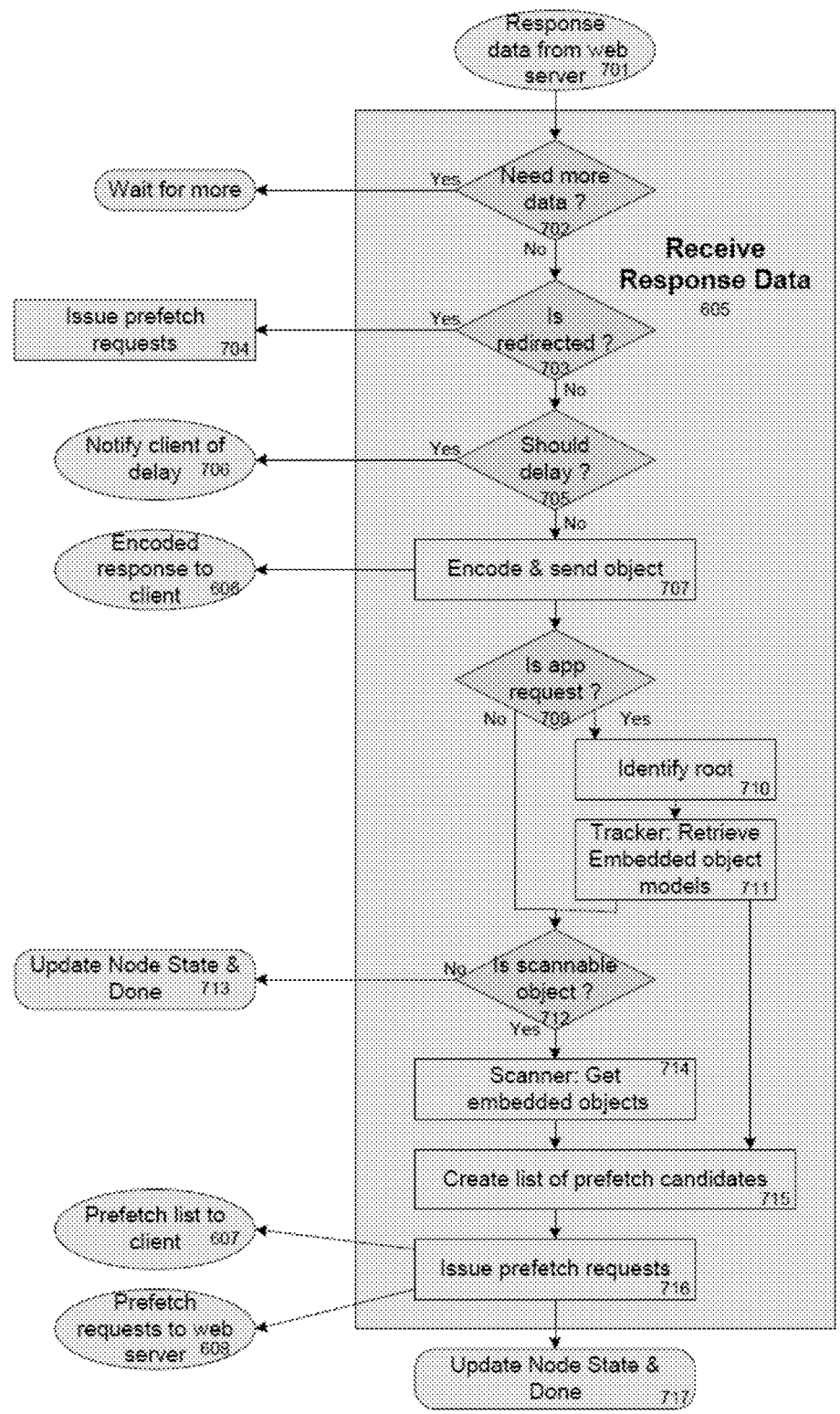
FIG. 7 illustrates one potential implementation of data flow for receiving response data in accordance with embodiments of the innovations presented herein.

Various portions of the data flow 600 are described in more detail below with reference to other figures. FIG. 7 shows a flow diagram of an illustrative method 700 for receiving response data, as described above with reference to block 605 of FIG. 6, according to various embodiments. The prefetch decision making can often be improved by accumulating response data, so that the size of a file can be used in determining whether to push the prefetched object to the client. This strategy was first disclosed in previously incorporated U.S. patent application Ser. No. 12/172,913, titled "METHODS AND SYSTEMS FOR PERFORMING A PREFETCH ABORT OPERATION," filed on Jul. 14, 2008. The threshold above which it is inefficient to accumulate can be determined when the request is issued using techniques to be described subsequently, so that the response data can be accumulated [702, 703] until either the full response is received or this threshold is reached.

Once the object is received or the target amount of data is received, the HTTP header is read to see if it specifies redirection [703] via HTTP response codes "301," "302," or "303." If so, the new location becomes a candidate for prefetching [704] and the redirection response is also forwarded to the client. More details on the handling of redirection are provided subsequently.

If the response is for a prefetched request and the target threshold was reached or the file size is otherwise known, it is checked to see if it is too large to push across the satellite link. This process was described in U.S. patent application Ser. No. 12/172,913, titled "METHODS AND SYSTEMS FOR PERFORMING A PREFETCH ABORT OPERATION," filed on Jul. 14, 2008, which is incorporated by reference herein for any and all purposes. Similar techniques are also described further below.

If it is determined that the object is too large, a notice is sent to the client optimizer [706] so that the client optimizer will notify the server if a request arrives and the file data can downloaded. The RTT across the satellite link is not reduced in this case, but the latency in receiving the file from the content server is reduced, so a benefit may still be obtained. To prevent more data from arriving on the server until a request is received from the client side, the TCP connection to the content server can be throttled when the delayed-mode is initiated. The throttle can reduce the bytes accumulated on the server while waiting for a client request, while keeping the socket alive for fast resumption if a request is subsequently received.

If the object is not delayed, it may then be encoded and pushed across to the client-side optimizer [707, 708]. The actual sending may be delayed until some of the prefetching steps described below occur, so that the prefetch information arrives at the same time as the response data.

The next step is to determine the "root page" for this response file. The root page is the page that the user actually requested, as distinguished from "child objects", which are the images, style sheets, scripts, and other files that the application requests in order to display or otherwise interact with the root page. Using the techniques to be described subsequently, the server side optimizer can improve its prefetching performance by determining whether each response is a root page or a child object. If the response is a child, then it also needs to determine what root page is responsible for the child. The optimizers are often network-level devices with no direct knowledge of the user actions. Instead, the optimizers see a stream of HTTP requests and responses that may involve objects from multiple pages arriving at overlapped intervals.

If the response is from a prefetch request, the root page is already known, since the root would have been determined when the parent was requested. A "parent" is the object whose download triggered the prefetch request. Rendering a web page or otherwise using HTTP data may require an iterative process that results in the download of multiple objects. A page might begin with an HTML file that contains other objects such as style sheets (CSS) or Java Scripts (JS) that in turn may require downloading other objects that in turn may request other objects. The CSS might be a parent of several images or other referenced within it, even though the CSS is not a root. A single root page can thus create a hierarchy that includes multiple parents each with child objects. A child node may also be a parent of its own children. A parent that is not a root page will be called an "intermediate node". An illustrative object hierarchy is described below with reference to FIG. 21.

If the response is directly from the user application [709], then neither the parent or root page may be known. In that case, embodiments may identify whether this response is a root page or else determine which of the "active root pages" is its parent [710]. An active root page is a root page whose children are currently being downloaded. Techniques used to identify the correct root page are described below with reference to FIG. 22.

If the new response is a root page, the prefetch tracker history is called to see if this same root page has been previously downloaded by this user or by other users of the optimization system [711]. If so, this information may be used to improve the prefetching for the current request. This information is obtained from both a user-specific history which tracks the traffic for a single user over a long period of time, as well as a global history, which tracks pages of interest to many different users of the network. The collection and use of this history will be described in more detail below. This history data may be sent to a module [715] configured to compile a list of candidate URLs for prefetching.

In some embodiments, a next step is to determine if the response is "scannable" [712]—that it is an object type such as HTML, CSS, or JS that may contain children. If it is not, information may be added to various models and then processing of this response is completed. If it is scannable, the response data is sent to the "scanner" [714], which is a parser for HTML, CSS, and other parent files that identifies URLs that are likely to be requested after the user application receives this parent page. The scanner identifies URLs and also provides information about how they were identified which will be used as shown subsequently to improve the prefetching performance.

The information from the tracker and the scanner is then used to build a list of prefetch candidates [715]. The tracker may have identified items from previous requests of the root page that were not found by the scanner. The scanner may have identified URLs that were never seen in prior downloads of the root page. The information from the two may be combined so as to improve the prefetching performance as will be detailed subsequently. The primary output of this module is a list of URLs and information about them, such as how they were identified, cookie management information, and estimated probability that the user will request them (e.g., as described with reference to the cost-benefit analysis of FIG. 2).

This candidate list is then sent to a module [716] which decides whether to prefetch each object, based on factors such as the link conditions and whether the object may already be in the browser cache. More details on this module are provided below. If it decides to prefetch a URL, it adds the URL to the list [607] of prefetch objects that is sent to the client optimizer and it issues a prefetch request [608] to the content server.

The tracker model data is updated [717] for each object processed by the system. For each prefetch request issued, the model may store timing data, cookies that were used, information about how it was identified by the tracker and/or scanner, and information on the parent. For each response received, additional timing and cookie data may be stored. The structure and use of these models is described below.

Figure 8:
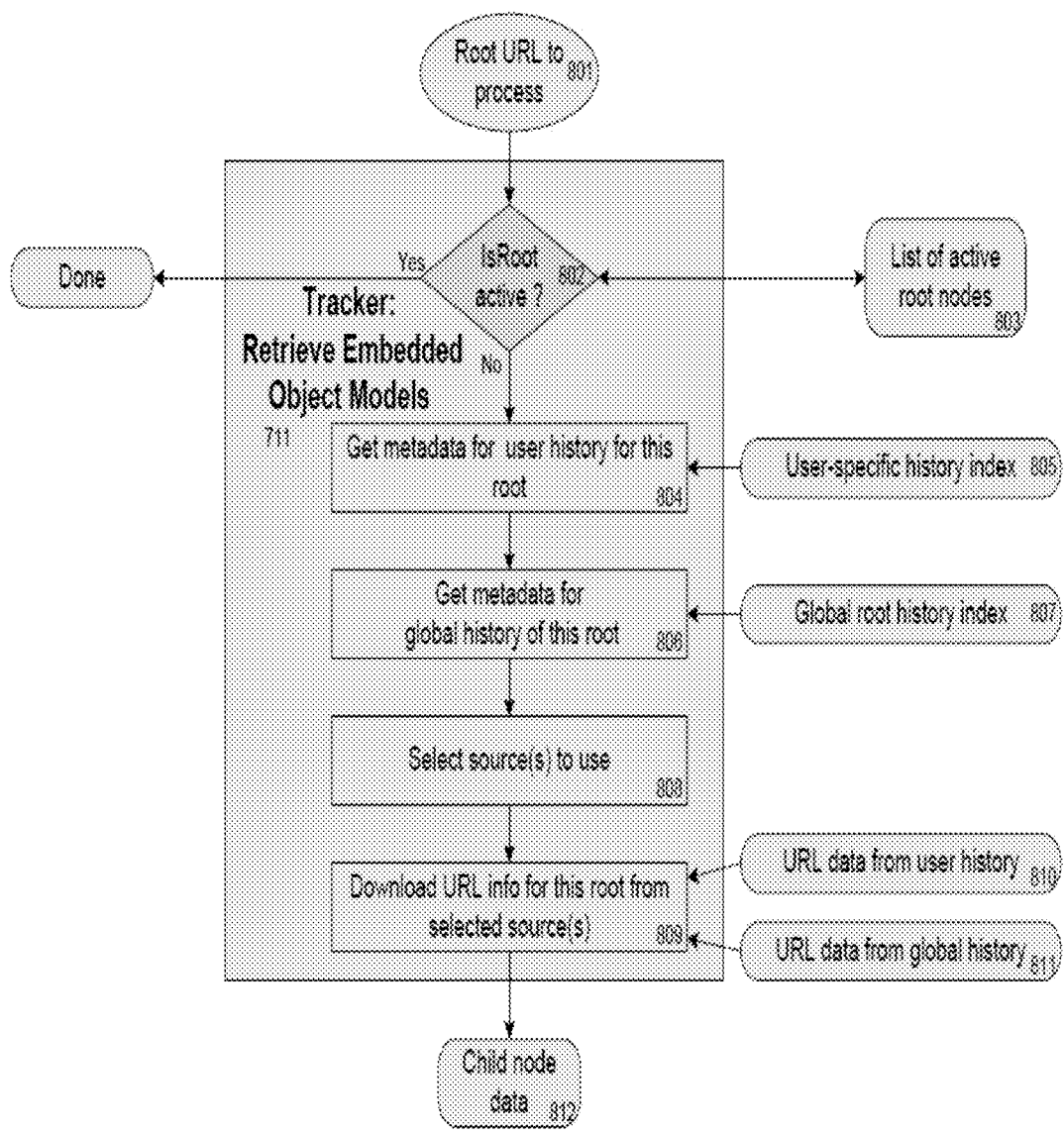
FIG. 8 shows a flow diagram in accordance with embodiments of the innovations presented herein.

FIG. 8 shows a flow diagram of an illustrative method for using the tracker to retrieve a history [711] used to improve prefetch performance, according to various embodiments. The module receives the URL [801] of root pages that were requested by the user application. It first uses a list of active root nodes [803] to check if this root is currently active. This interval begins when a root URL is detected and then continues as long as the client application is requesting child objects that are part of this root. The root becomes inactive after a time-out interval after the last reference, where the time-out interval length is a function of the link characteristics and a model of application behavior. For example, if the client and server are connected via a slow link, the download of a single child object could delay subsequent requests for other children, so that a longer time-out interval is needed.

If the root is already active, nothing further needs to be done, as the history has already been checked. This is an unusual cases, as might occur if a web site redirects back to itself but with a different set of cookies, or if a user clicked on a site twice. If the root is inactive, it is added at this point to the list of active roots [803].

The next step is to check metadata for the user-specific history for this root [804]. The metadata is contained in the user history index [805] which might be located in memory for fast access. Similarly, the metadata is next checked for the global history [806,807]. The source(s) to use is then selected [808]. If a model is available in only one location (user or global), then that model is used. In many cases, the metadata will indicate that only one of the models is needed. For example, the user may have a model that is more recent than the global, in which case the global may not add enough value to justify loading it. Conversely, the global model may have recent data on a popular site which the user has not visited for a long time, so that the user model is not needed. In some cases, both models may be useful and can be retrieved. The selection performed in this module is an optimization to save overhead in loading models of little value, but the actual way that multiple models can be used is shown in detail subsequently.

The model index describes the status of the root page, such as how many times or how recently it has been downloaded. Based on this data, a decision is made whether to load the user and/or global model. The full model contains statistics about each of the child URLs associated with this root as needed to optimize the prefetching decisions with respect to each potential child. The selected model(s) is then retrieved [809, 810, 811] and then sent to the module that creates the list of prefetch candidates [812, 715].

It may be desirable to provide a further discussion of identifying prefetch candidates for the sake of clarity. In a basic implementation of http prefetching, if a child URL node is identified then it is prefetched. Such an approach would result in a large number of extra URLs prefetched and not used, using bandwidth without a benefit to the end user or the carrier. A better prefetching system attempts to be more intelligent about which identified child URL nodes are prefetched and which are ignored.

In general, a child node is identified either via the scanning of container objects (URL scanning) or via the tracking of previously requested URLs associated with a root node (URL tracking). Scanning and tracking provide a rich set of information that can be used to provide a recommendation to the system about whether or not a given URL should be prefetched. The system can then adjust the recommendation based on other factors (current load for instance) to make the final decision to issue the request or not. In the simplest implementation, a prefetch recommendation will be a binary yes or no, indicating to prefetch or not to prefetch.

In other systems, the recommendation will take the form of a probability or a weighting factor. In some systems, probability or weighting factor can be experimentally derived for a given child URL classification, which is based on information derived from both URL scanning, such as what type of container URL was the child URL identified from and in what context within that container, and URL tracking, such as the number of times an object has been prefetched but not requested by the user since the last time it was requested by the user, for example.

It may be desirable, for the sake of added clarity, to describe factors used to arrive at a decision whether to prefetch a given child node, and to provide some examples of the ways these factors can be used to come to a recommendation. In some embodiments, factors are derived from URL scanning. When a container object is parsed to scan for embedded or child objects, it can provide the following information about the object URL and the conditions and context under which it was identified:

1. Container Type—HTML, javascript, CSS, XML, or other.
   a. Extension: The extension or the suffix of document (container object) in which the child URL was found via scanning. Examples but not limited to: .html, .htm, .js, .css, .xml, .jsp, .asp, .aspx.
   b. Content Type: Http content type of the container object in which the child URL was found via scanning. These include but are not limited to the "text" content types listed here—http://www.iana.org/assignments/media-types/text/.
   c. Container type is also identified by parsing the first few bytes of the container file. For instance, frequently an HTML file will have no extension and no content type. When this is the case, we identify it as HTML by looking for "<!DOCTYPE HMTL" in the first several bytes of the file itself.
2. Found In Html Tags or Attributes: This is the HTML tag or attribute in which the child object URL was found if it was in fact found within an html tag. Examples of HTML tags include but are not limited to A, SCRIPT, NOSCRIPT, NOFRAMES, IMG, LINK, FRAME, IFRAME, STYLE, OBJECT, PARAM, EMBED, INPUT, BUTTON. An example of an HTML attribute, is the onmouseover attribute.
3. Is Child Imported Explicitly: Indicates whether or not the child object is explicitly imported by the container file via @import.
4. Child URL Extension: The extension or suffix of the child URL that is found via scanning, if any. Examples include but are not limited to common image suffixes (.jpg, .gif, .png) and other common web object suffixes (.js, html, .css, .swf).
5. Child URL has hostname. This indicates if the parsed URL includes a hostname of the following form: http://<hostname>/the/rest/oftheURL.ext.
6. Child URL has protocol prefix. Found "http://" as part of the parsed child URL.
7. URL Found in Document Write. Found URL inside of a javascript document.write call such as document.write ("<IMG SRC='my.gif').

These and/or other factors can be used to determine whether or not a prefetch request should be issued.

The first time a request for a root URL is seen, there may be no URL tracker information available. In this case, it may be possible only to identify child URLs from scanning. As such, the decision whether to prefetch may be based completely or partly on these URL scanner-derived factors. In other embodiments, factors are derived using URL tracker functionality.

URL tracker may have an entry for every child URL associated with root html page where that association was established either via scanning or via client feedback (e.g., the process of recording requests associated with root HTML downloads). In some embodiments, some or all of the following information about each tracker entry can be used to make prefetch decisions:

1. Prefetch successes. The result of past attempts to prefetch the child URL that were successful.
2. Prefetch mistakes. The result of past attempts to prefetch the child URL that were unsuccessful, meaning the system prefetched and downloaded an object but that object was not subsequently requested by the user.
3. URL scanner misses. Tracker records every request emitted by the browser in response to a root HTML (which corresponds to requests to load a given web page by the user) and therefore is able to identify child URLs not identified by the scanner for consideration as prefetch candidates when the same root HTML is later requested by the user.
4. Age of each page load. The time when each attempt to load a page was made by a user, which is an indication of the freshness of the information stored in URL tracker.
5. Scanner context associated with a child URL for each page load. Embodiments of the tracker store whether or not a given child URL was identified by the URL scanner for each attempt to load a page in the past. In addition, it may store the scanner context, which is the complete set of information described above that is detectable by scanner for each object that it identifies.

Any or all of these factors can be used to determine whether or not a prefetch request for a given child URL should be issued.

Some embodiments of the tracker implement user-specific URL tracking, while other embodiments of the tracker implement global URL tracking. URL tracker information may be stored persistently on a per-user basis and/or on a global basis. Per-user tracker information may record the correlation between root page requests and subsequent child requests made by an individual user or user group. In most cases, the user-specific tracker information, when available and fresh, may most closely predict the subsequent likelihood that child objects will be requested by a user when HTML root pages are requested. The reason may be, for example, that web page structure is frequently dynamic and dependent on user preferences, browser version, and other factors that vary from user to user such as location.

A global tracker may allow a user to get the performance benefit of URL tracker even when they visit pages for the first time, as other users of the system may have browsed to these pages, such that the history information will be stored in the global URL tracker. In addition, for popular pages with dynamic content that changes often, global tracker may often contain the most up-to-date information on the probability that a given child URL will be requested when a given HTML page is requested by the browser.

Certain embodiments seek to establish a comprehensive prefetch model. To make the decision to prefetch a given child URL or not, embodiments may consider available information provided by the URL scanner, the user-specific URL tracker, and the global URL tracker. The superset of all of the above described factors can be considered a comprehensive prefetch factor list.

Other embodiments use a relatively simple prefetch model. A simple priority model could be implemented whereby the presence of a fresh user-specific URL tracker entry indicating that previous attempts to prefetch a given child URL were successful results in the decision to recommend that the object be prefetched by the system. The same simple model could fall back to a global entry if no user-specific URL tracker information is present. Further, if no global entry is present, some embodiments rely on URL scanning factors to make their recommendations to the system. This prioritization technique may be extended to the prefetch factors themselves where specific priorities could be assigned in an ad hoc way based on an understanding of the way Internet web sites are built and the way they evolve over time.

Still other embodiments use a composite prefetch model. For example, a more sophisticated heuristic model may be implemented whereby the combination of factors are considered in total to derive an overall level of confidence, or probability, that a given object will be used if prefetched. The weight or probability given to the existence and state of a given factor can be assigned in an ad hoc way based on understanding and/or trial and error. This approach may be further enhanced by iteratively measuring results, identifying poor decisions, adjusting the model accordingly, and re-running performance tests.

Yet other embodiments use an experimentally derived prefetch model. For example, probabilities or weights assigned to each factor when present can be derived experimentally. By measuring the rate of prefetch success when a given factor has a given value, and then plugging these back into the system, a linear formula can be used at runtime to provide a recommendation in terms of probability or likelihood that a given prefetched object will be subsequently requested by the user when a root HTML page is downloaded. Embodiments of the technique use a linear regression analysis technique to generate a coefficient or weight of each factor based on the experimental measurement of the relative ability of each to predict prefetch success or failure.

And other embodiments use an experimentally derived, adaptive prefetch model. For example, a finite number of bins (e.g., categories or classifications) may be defined, where each bin is defined by the full set of the available prefetch factors and their corresponding values. Embodiments may then measure, during a long-running test that downloads a large number of web sites, the relative success or failure rate when the values associated with that bin are true. In this way, a probability may be generated that a given prefetch request will result in a success or a failure.

These probabilities can then be applied back into the system so that when a prefetch candidate URL, a child URL node, is being processed it can simply be classified as belonging to one of the bins in order to assign a probability of prefetch request or failure to the given node. This may provide a lightweight but powerful scheme that considers the comprehensive set of available information to make a recommendation with a numerically assigned confidence level associated with that recommendation.

In another embodiment, a similar technique is modified to be adaptive, as the probabilities associated with each category/bin/classification are updated substantially in real-time as the prefetch system operates and continues to receive feedback from users browsing web sites. This may reduce (or even remove) the dependence of derived probabilities on the ability to develop representative sample sites, as well as the accuracy of test tools to model real-world browsing behavior. Notably, the adaptive component may allow the model to change as the structures of web sites change over time, so that improper prefetch decisions are avoided as web technologies change. The adaptive technique may be added to the experimentally derived probabilities, so that the prefetcher may always start with primed probabilities. This may provide good performance at system startup, and improved performance as the sample sizes from real-world usage become statistically significant.

In one illustrative embodiment, a prefetch system is used to classify each prefetch candidate URL into a single category or bin with an experimentally derived probability associated with it could be implemented. According to the embodiment, the above prefetch factors may be converted into a reduced list of factors with a reduced set of possible values. The reduction decision is based on what has been observed as statistically significant in some experimental runs and of course can be modified as needed. The purpose of the reduction is primarily to simplify the implementation and the description of the implementation and does by no means reflect what is being claimed in this invention.

As described above, a set of reduced prefetch factors and possible values may be categorized as URL scanner factors, user-specific URL tracker factors, and global URL tracker factors. Illustrative sets of these factors are described in turn.

The URL scanner factors may include the following:
1. Seven CONTAINER_TYPE values: JS_FILE, CSS_FILE, HTML_FILE, XML FILE, JSP FILE, ASPX FILE, UNKNOWN FILE, NO_CONTAINER. These indicate the file where the scanner identified the candidate URL. A value of NO_CONTAINER indicates that scanner information is not available.
2. Nine TAG_TYPE values: TAG_SCRIPT, TAG_FRAMESET, TAG_IMG, TAG FRAME, TAG IFRAME, TAG STYLE, TAG OBJECT, TAG PARAM, TAG_UNKNOWN. These indicate the HTML tag within which the candidate URL was identified. Default value is TAG_UNKNOWN.

The user-specific URL tracker factors may include the following:
1. Five USER_HISTORY values: USER_NoFailsOneRequest, USER_NoFailsTwoOrGreaterRequests, USER_OneFailOneRequest, USER_OneFailTwoOrGreaterRequests, USER_GreaterThanOneFail, USER_HISTORY_NA. These values indicate a combination of the number of prefetch mistakes or failures (prefetched object was not requested by the user) since last success and the overall number of requests for the object. If there is no user-specific tracker information available, then the value of USER_HISTORY is USER_HISTORY_NA.
2. Two USER_AGE values: USER_FRESH, USER_STALE. A fresh entry indicates that it has been updated in the last week.
3. Two USER_SCANNER_STATE values: USER_SCAN_FOUND, USER_SCAN_NOT_FOUND. These values indicate whether or not the user-specific scanner was able to identify these URLs when their container object was last parsed.

The global URL tracker factors may include the following:
1. Four GLOBAL_HISTORY values: GLOBAL_NoFailsOneRequest, GLOBAL_NoFailsTwoOrGreaterRequests, GLOBAL_OneFailOneRequest, GLOBAL_OneFailTwoOrGreaterRequests, GLOBAL_GreaterThanOneFail, GLOBAL_HISTORY_NA. These values indicate a combination of the number of prefetch mistakes or failures (prefetched object was not requested by the user) since last success and the overall number of requests for the object. If there is no global tracker information available for this child URL, then the value of GLOBAL_HISTORY is GLOBAL_HISTORY_NA.
2. Two GLOBAL_AGE values: GLOBAL_FRESH, GLOBAL_STALE. A fresh entry indicates that it has been updated in the last week.
3. Two GLOBAL_SCANNER_STATE values: GLOBAL_SCAN_FOUND, GLOBAL SCAN_NOT_FOUND. These values indicate whether or not the user-specific scanner was able to identify these URLs when their container object was last parsed.
4. Two GLOBAL_TRANSITION_STATE values: GLOBAL_TRANSITIONS_ONE_OR_NONE, GLOBAL_TRANSITIONS_TWO_OR_MORE. These values provide an indication of the number of times the object has transitioned between a prefetch success and a prefetch failure. If the count is high, then the object is very likely user-dependent in some way. More on this below.

Every prefetch candidate child URL has a value for each of the above variables, or prefetch factors. The combination of all of these values classifies the candidate URL into a unique category or bin. In this illustrative embodiment, there are 7×9×4×2×2×4×2×2×2, or 32,256, possible categories. Each of these categories will have a probability associated with it. As described above, this prefetch probability table or matrix can be both experimentally derived from a long running test against representative web sites and then plugged into to provide a good primer available at system startup and it can also include an adaptive component where probabilities are updated by the prefetch acceleration system at runtime as we detect successes and failures for URLs and we update the probability of the category within which those URLs are classified.

An illustrative implementation may implement the following steps at runtime to obtain the probability that a given child URL will be successfully prefetched:
1. When a root HTML node is processed, we obtain three possible sets of information:
   a. The list of child URLs that were identified by scanning the root HTML itself if any and the CONTAINER_TYPE and TAG_TYPE values for each child URL, providing information on the context in which each child URL was found.
   b. The list of child URLs that were identified by the user-specific URL tracker if present and the USER_

HISTORY, USER_AGE, and USER_SCANNER_STATE values for each of these child URLs. If no user-specific history for this root HTML, USER_HISTORY will be set to USER_HISTORY_NA.

c. The list of child URLs that were identified by the Global URL tracker if present and the GLOBAL_HISTORY, GLOBAL_AGE, GLOBAL_SCANNER_STATE, and GLOBAL_TRANSITION_STATE values for each of these child URLs. If no global history for this root HTML, GLOBAL_HISTORY will be set to GLOBAL_HISTORY_NA.

2. For each unique child URL in the superset of all three lists found in step 1, look up the probability associated with that URLs values for CONTAINER_TYPE, TAG_TYPE, USER_HISTORY, USER_AGE, USER_SCANNER_STATE, GLOBAL_HISTORY, GLOBAL_AGE, GLOBAL_SCANNER_STATE, and GLOBAL_TRANSITION_STATE.

The experimentally derived probability value may reflect the interactions between the available prefetch factors without having to develop specific algorithms to take advantage of the available information.

Of course, embodiments of implementations, such as those described herein, may provide a number of features and benefits. For example, in typical prefetch systems, the list of objects to prefetch was determined by the parsing or scanning of root pages only. The idea of recording information about past prefetch successes and failures and uploading this information to the server for later use (referred to generally as "URL Tracking" herein) in prefetch decision-making provides additional functionality and benefits.

One potential benefit to URL tracking is that URLs that are not found via scanning may be found via URL tracking. This increases the potential ratio of successfully prefetched objects, which reduces round trips across the network, and decreases web page load times. This is the most direct and simple benefit to this invention. In the above implementation, 1a (scanning) would not include some child URLs that are found in either 1b or 1c (the list of child URLs that were identified by the user-specific URL tracker if present and the USER_HISTORY, USER_AGE, and USER_SCANNER_STATE values for each of these child URLs; and the list of child URLs that were identified by the Global URL tracker if present and the GLOBAL_HISTORY, GLOBAL_AGE, GLOBAL_SCANNER_STATE, and GLOBAL_TRANSITION_STATE values for each of these child URLs, respectively).

For the sake of additional clarity, suppose that an HTML file contains JavaScript that dynamically generates a request for an image file using a complex algorithm that is not easily parsed and re-constructed via URL scanning. This dynamic generation of the image URL and the loading of the image happens as part of page rendering so that until this image file is downloaded the web page cannot load completely. Embodiments of the URL scanner may not find this file. However, after the page had been visited (e.g., one time), the dynamically generated URL may be added to both user-specific URL tracker and the global tracker (e.g., assuming the page had not been requested by any other user of the system previously). The value of USER_HISTORY may be USER_NoFailsOneRequest and the value of GLOBAL_HISTORY would be GLOBAL_NoFailsOneRequest.

The next time a user of the system (e.g., the same or a different user from the one in the preceding example) visited this HTML page, the system may find an entry in the global tracker associated with the root html. In processing the prefetch candidate URLs, derived both from URL scanner and global URL tracker, the system may look up the probability associated with the dynamically generated child URL. Experimental and anecdotal testing has shown that the probability that a child URL will be requested by the user as part of rendering the root HTML is relatively high, when the child URL was requested once before and had never been prefetched, and therefore had never failed to be prefetched. Embodiments of the prefetcher may, therefore, recommend that the URL be prefetched with a confidence level equal to the probability retrieved from the probability table.

Notably, the probabilistic approach represents just one illustrative embodiment. Other embodiments cover cases where the recording of prefetch hits (e.g., the object is prefetched, and the user subsequently requests and uses the prefetched object), misses (e.g., the object is not prefetched, but the user subsequently requests the object), and mistakes (e.g., the object is prefetched, but the user does not subsequently request the prefetched object) associated with a container web object are used to optimize subsequent requests for that object and its embedded files. In general, URL tracking improves prefetch hit rates and thereby improves web browsing performance.

Another potential benefit to URL tracking is that, while prefetch hit rates may be improved by prefetching more web objects, embodiments may further reduce the number of objects prefetched that the user or the browser never requests. In the above example, suppose that the dynamically generated URL is for an advertisement and the advertiser wants to be able to download a new ad every time users browse to the given web page. In this case, the dynamically generated URL may contain a random number or a timestamp to make the URL unique every time the page is rendered.

If this is the case, then when the previously seen URL is prefetched, we will find that the user does not request it. This may be recorded as a prefetch failure, and both the global and the user-specific URL trackers may be updated with this information, accordingly. In the global URL tracker, for instance, GLOBAL_HISTORY may change from GLOBAL_NoFailsOneRequest to Global_OneFailOneRequest (e.g., which may correspond to a very low prefetch probability, as described above). For example, a third time this root page is loaded by a user of the system, the prefetch system may process all the prefetch candidates associated with this root page. In so doing, it will find that the likelihood that the child URL will be requested by a user the third time a user browses to the page is very low, for example, because the child URL was seen the first time a user of the system browsed to the page, but was not requested the second time another user browsed to the same page. The URL may therefore not be prefetched (e.g., or may be a very low priority prefetch request). In general, the URL tracker may reduce the rate of prefetch mistakes, saving bandwidth both for the user and the network service provider or carrier.

Other potential benefits of various embodiments result from integration of the URL tracker and URL scanner functionality and information. For example, as described above, relying solely on the URL tracker to make prefetch decisions may involve making mistakes to learn that a given child URL is not prefetchable. This means that if web site content changes and an object that was prefetchable becomes a prefetch mistake (e.g., because the front page news story on CNN.com changes and the picture on the main page is no longer prefetchable though it had been successfully prefetched in previous browses to the page), URL tracker may have to request that file and download it to the end user's machine and then learn that the user did not request it before it is able to prevent that same extra download on subsequent browses to CNN.com.

It may be possible, however, to mitigate this issue by incorporating scanner information along with URL tracker information into prefetch decision-making. For example, if when the object was the front page picture on CNN and was therefore prefetchable in the past, the value for GLOBAL_SCANNER_STATE, and USER_SCANNER_STATE for the users who browsed to CNN.com when the image was on the front page, would be GLOBAL_SCANNER_FOUND and USER_SCANNER_FOUND respectively. After the image has been taken down from the CNN.com front page, the prefetcher may discover that there is no URL scanner information available when processing this child URL to determine whether it should be prefetched. As described above, for example, CONTAINER_TYPE may be NO_CONTAINER. However, suppose URL tracker indicates that last time the object was prefetched, the URL scanner found the URL. The prefetcher may then proceed to determine, with reasonably high confidence, that the content on the website has changed, and the probability that this embedded image URL will be requested is low. As such, the prefetcher may not attempt to prefetch the image, thereby avoiding a potential prefetch mistake.

Still other potential benefits may result from the URL tracker's keeping track of the last time a page was requested. Using this information may allow freshness of URL tracker information to be factored into prefetch decision making. For example, the prefetcher may have significantly less confidence about a prefetch result recorded many months ago than about results recorded minutes ago. In the illustrative probability table implementation above, the month-old entry will have GLOBAL_AGE and USER_AGE values of GLOBAL_STALE and USER_STALE respectively.

The probabilities assigned to the categories (or bins) determined by the totality of the prefetch factors that include GLOBAL_AGE and USER_AGE may be significantly lower than the bin that has all other factors the same except the age values are GLOBAL_FRESH and USER_FRESH respectively. Once again, the experimentally derived probability table takes full advantage of this insight. In other embodiments, the use of the age could be more explicitly built into the logic of the prefetching system. Also, finer-granularity decisions may be made based on the numeric value of the age, as opposed to on a Boolean fresh or stale classification.

Other potential benefits of the URL tracker may result from user-specific URL tracking. Many web sites deliver different content depending on the user that is logged into the website. One example of this is themed websites that present a different look and feel to each user by loading different images and style sheets depending on user preferences. This may be problematic for embodiments of a global URL tracker, because a themed image that would be a prefetch success for one user may effectively be a prefetch mistake for another user.

User-specific URL tracking addresses this issue by recording and tracking root- and child-node prefetch result information separately for given users. For example, as described above, presence of user-specific URL tracker information (USER_HISTORY != USER_HISTORY_NA), may increase the prefetch probability for objects subsequently requested by the same user. In the specific example of the themed image child URL above, USER_HISTORY could have a value of USER_NoFailsTwoOrGreaterRequests for that child URL in the user-specific tracker, assuming the user visits this root web page frequently, even if other users on the same system visit the same root page frequently and their user preferences cause them not to request this themed image. In this case, GLOBAL_HISTORY may have the value of GLOBAL_GreaterThanOneFail, while the probability of the object being requested by the particular user would still be high, due to the value in the user-specific URL tracker.

Notably, some embodiments explicitly track transitions between prefetch failures and successes explicitly using the GLOBAL_TRANSITION_STATE. This may allow the model to detect the scenario where a URL is a consistent prefetch hit (or success) for some users but not others when they browse to a given website. Again, tracking transitions between prefetch success and failure in particular may be a lightweight (e.g., a memory- and/or CPU-efficient) way to exploit user-specific URL tracking to improve prefetching decisions, particularly where web content tends to change with user preferences. Still, brute force techniques may be used in other embodiments, for example, where the global URL tracker is scanned to see if some users consistently experience prefetch success while others experience prefetch failures.

Figure 9:
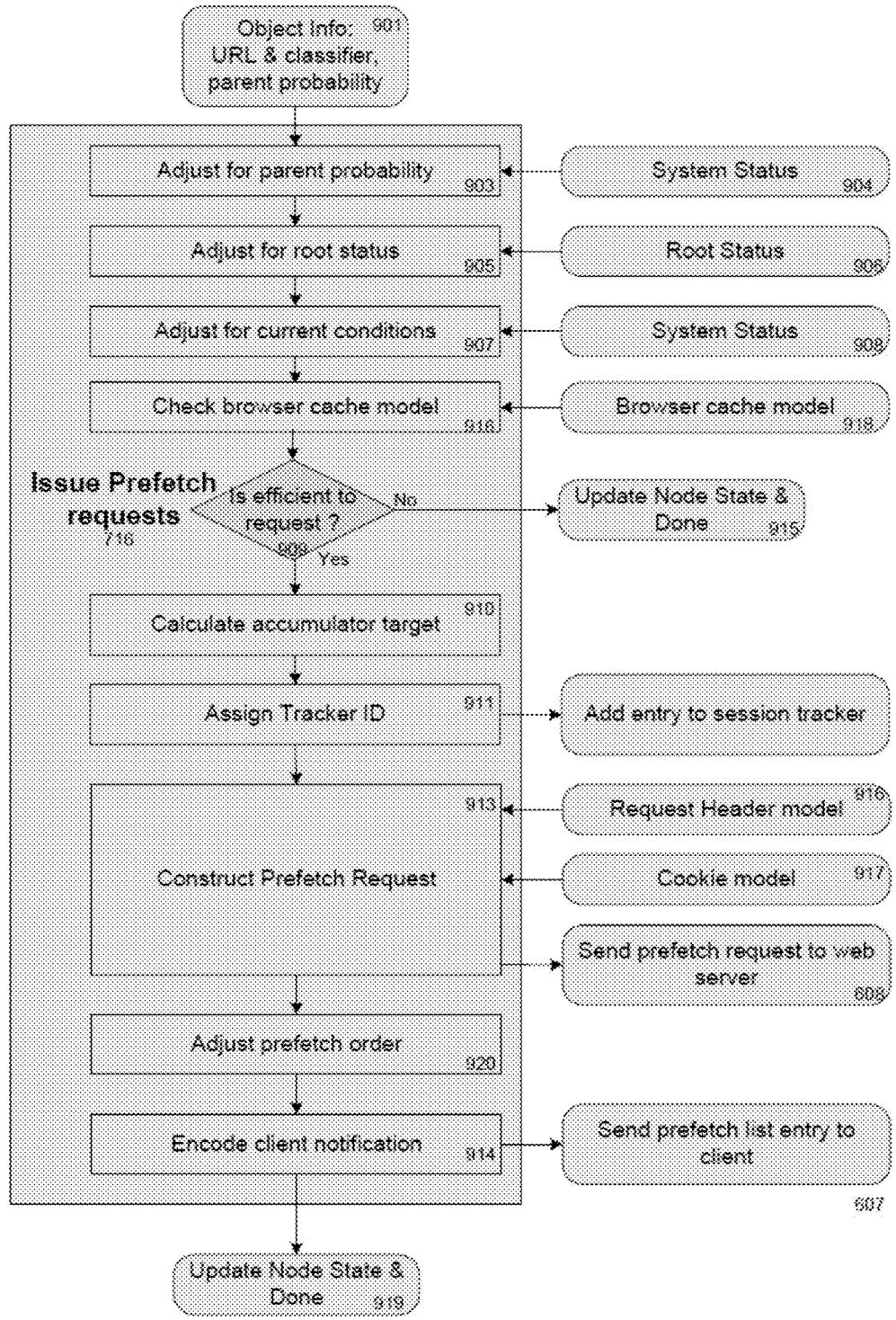
FIG. 9 shows a flow diagram including prefetch filtering in accordance with embodiments of the innovations presented herein.

FIG. 9 shows a flow diagram of an illustrative method for filtering prefetch candidates and issuing prefetch requests, according to various embodiments. For example, embodiments of the flow chart include further discussion of block [716] of FIG. 7, which described how a list of prefetch candidates is filtered and how prefetch requests are issued. The list [901] may include the URL candidates and a probability that each may be requested by the user application. This probability may have been generated according to the tracker history and/or the context information supplied when/if a URL is identified by the scanner (e.g., as described above).

The first step is to adjust the child probability as a function of the parent probability [903]. For a URL identified by the tracker, no adjustment is needed, as the parent is the root node that was requested, so the parent probability is 100%. For items identified by the scanner, the parent probability may be less than 100% if the parent itself was a prefetched object. For example, the scanner may identify a CSS file and estimate that the probability of it being requested is 50%. The CSS might then be prefetched and an image on it might be identified. The scanner probability model assumes that the parent is requested, so the probability of the image being requested might be 90% in that case. But the prefetched CSS may be received before it is known whether the parent is being requested, and the page download would be delayed if the server waited to hear from the client that the CSS was requested. Instead, it may be efficient to calculate a recursive probability.

The simplest method for calculating the recursive probability is to multiply the parent probability by the URL's context-based probability. In the example case, the probability that the image will be requested could be estimated at 90%*50%=45%. If, instead, the probability that the parent CSS would be downloaded was originally estimated at 10%, the chances of the image in the same scanner context being downloaded may be 9%. The combining of the probabilities may be used to protect against excessive recursion, as the probability is decreased with each level of recursion. The parent probability is provided by storing the probability of the objects that are prefetched, so that it is available when the objects are scanned [714].

This approach can be further improved by storing data about URLs that were not prefetched due to a low parent probability. If the node update uploaded by the client [619] indicates that the parent was actually requested, some benefit can still be obtained by prefetching at that time the objects that would have been prefetched if the parent probability had been 100%, which it is now known to be.

The next step is to adjust the probability for the status of the root object [905]. A scanner may sometimes identify a larger number of objects to prefetch than is desirable, as the aggregate traffic could congest the link, and the large number is also an indicator that the scanner may be making a mistake. Some protection can be added against these problems by tracking the number and sizes of objects prefetched for a root page. As this value increases, the probabilities for new URLs can be adjusted downward, so that the system becomes more selective about what it prefetches. These counts can also be used to place an absolute cap on the amount prefetched in support of any object.

The next step is a similar adjustment for link congestion and other system issues [907]. If the high latency link is backlogged for any reason, the costs of prefetching are increased, which can also be mitigated by making the prefetcher more selective. This increase in selectivity can be achieved in several ways, such as decreasing the probability assigned to each URL during the congested interval. Another system variable might be overall congestion on the satellite beam, which might be reduced by making the prefetching for all users more selective.

The next step is to check the model of the browser cache [916]. If an application request is likely to be served from the browser cache, it is less likely that a request for the URL will be sent to the client side optimizer, so that the prefetched response is less likely to be used. The optimizer server can maintain a model of the browser cache that stores the cache management directives from the HTTP header and download timestamp for all objects that are downloaded to the user. This model can be further enhanced by monitoring the application to record whether it is following the standard HTTP caching directives and then adjusting the cache model to reflect the application behavior. The cache model can be used to determine the probability that the prefetched response will not be used for this reason, which in turn can be used to adjust the usage probability for this URL candidate.

The final step before prefetching may be to determine whether it is efficient to prefetch a URL based on the probability, the link characteristics, etc. In some embodiments, the general equations outlined for prefetching above with reference to FIG. 2 may be used. For example, the benefit of prefetching may effectively be the time saved due to eliminating a RTT if the object is used, which can be expressed as RTT*ProbabilityUsed. The cost may effectively be the time that the link is unnecessarily blocked by the download of the object if the object is not subsequently requested by the client application. This may be a function of the object size and the link bandwidth and can be expressed as (1−ProbabilityUsed)*Size/Bandwidth.

In some typical prefetchers, any use of probabilities is restricted to determining whether to push a prefetched object across the satellite link once the response was received. However, some costs are incurred from prefetching even if the object is not pushed. These costs include the bytes transferred on the link for starting the transfer, processing costs on the server for the prefetching, and costs to the network provider for downloading objects that are not used. Consequently, embodiments set a minimum size value in the cost equation and to compute a cost based on this minimum size before issuing the prefetch request. In that way, URLs with the lowest probabilities are not prefetched at all.

This cost/benefit equation is calculated at [909] and the URL is not requested if the prefetch is not likely beneficial. The node state for this URL is updated to reflect this decision [919], and in some cases the URL can be added to a delayed list as discussed previously in the parent probability module [903].

Once it is determined that a prefetch request will be issued, the accumulator operation [702] can be improved by calculating the optimum target accumulation threshold [910]. This is achieved by calculating the maximum object size that can be pushed to the client efficiently. This threshold is the point where cost=benefit, or $$RTT*ProbabilityUsed=(1-ProbabilityUsed)*Size/Bandwidth.$$

Solving this equation for size results in:

$$Size=Bandwidth*RTT*ProbabilityUsed /(1-ProbabilityUsed)$$

This value can be provided to the accumulator. If the file size is not specified in the HTTP, the accumulator can throttle the upstream TCP socket when it has reached this value without reaching the end of file. The target size can also be capped with fixed limits to protect other system resources such as upstream bandwidth. This strategy minimizes the number of bytes that have to be accumulated on the server while still maintaining optimum performance.

Some embodiments assign a tracker ID [911], which may reduce the amount of data that has to be uploaded in the node state update [619]. A unique identifier is assigned to each prefetched object and is downloaded as part of the prefetch list entry [610]. On the server side, this ID can be used as a key for a map entry whose payload can be identifiers for the root page and the child URL that was prefetched. This may allow the client to upload the node state update [619] without including these long strings, and thereby reduce the amount of return link (RL) bandwidth used for this purpose. This map can be part of the session tracker data [912], which maintains state information about the active roots.

The prefetch request can then be constructed. The header values should use HTTP header parameters that are the same as if the request had been uploaded by the user application. Some parameters, such as UserAgent or encodings supported can be determined from the request that was uploaded for the root page, which can be stored in the HTTP header model [916].

Another issue may involve adding cookies that match the cookies that would have been used if the user application had issued the same request. These cookies may be associated with a different domain or folder than the root page. This issue may be mitigated by using a cookie model [917] that keeps track of the cookies downloaded for a user. This model can supply the cookies for the domain and folder of the prefetch URL based on previous traffic to that location. For example, when a user requests a root HTML page, that request may includes cookies. These cookies may be included with any objects prefetched from this root or identified by scanning its children. In addition, cookies may be dropped, or set, by the content server in responding to prefetched requests. These dropped cookies may be added to the original cookie list (e.g., from the request for the root HTML page) for subsequent prefetch requests.

Another potential issue with cookies is that prefetching may affect the process through which cookies are added by the content servers. A response to request A may add a cookie, that is then added by the client application to the next request B. A prefetcher might request A and B at the same time, so that the request B would not have the new cookie that was added in the response to A. Embodiments of the tracker can help in this process by recording the order in which the user application requests objects, and issuing the responses in that same order.

Furthermore, embodiments of the tracker record the objects on which new cookies were dropped, and then wait for these responses before issuing subsequent requests. The recording of the order requires participation from the client side, since requests filled with prefetched objects never reach the server. This issue may be addressed by using the node state update [619], which can record the sequence in which requests are issued by the user application and include a sequence number in the uploaded update [619] that allows the tracker to reconstruct the correct sequence the next time that the root page is requested. The order and timing at which the prefetch requests are issued can be adjusted [920] to enable the cookies on the prefetch requests to match those that are issued by the user application.

The prefetch request is then uploaded to the content server [608]. Afterward, an entry for this URL is added to the prefetch list [914] that is downloaded to the client optimizer [607]. This entry specifies the URL that is being prefetched and the tracker ID.

Figure 10:
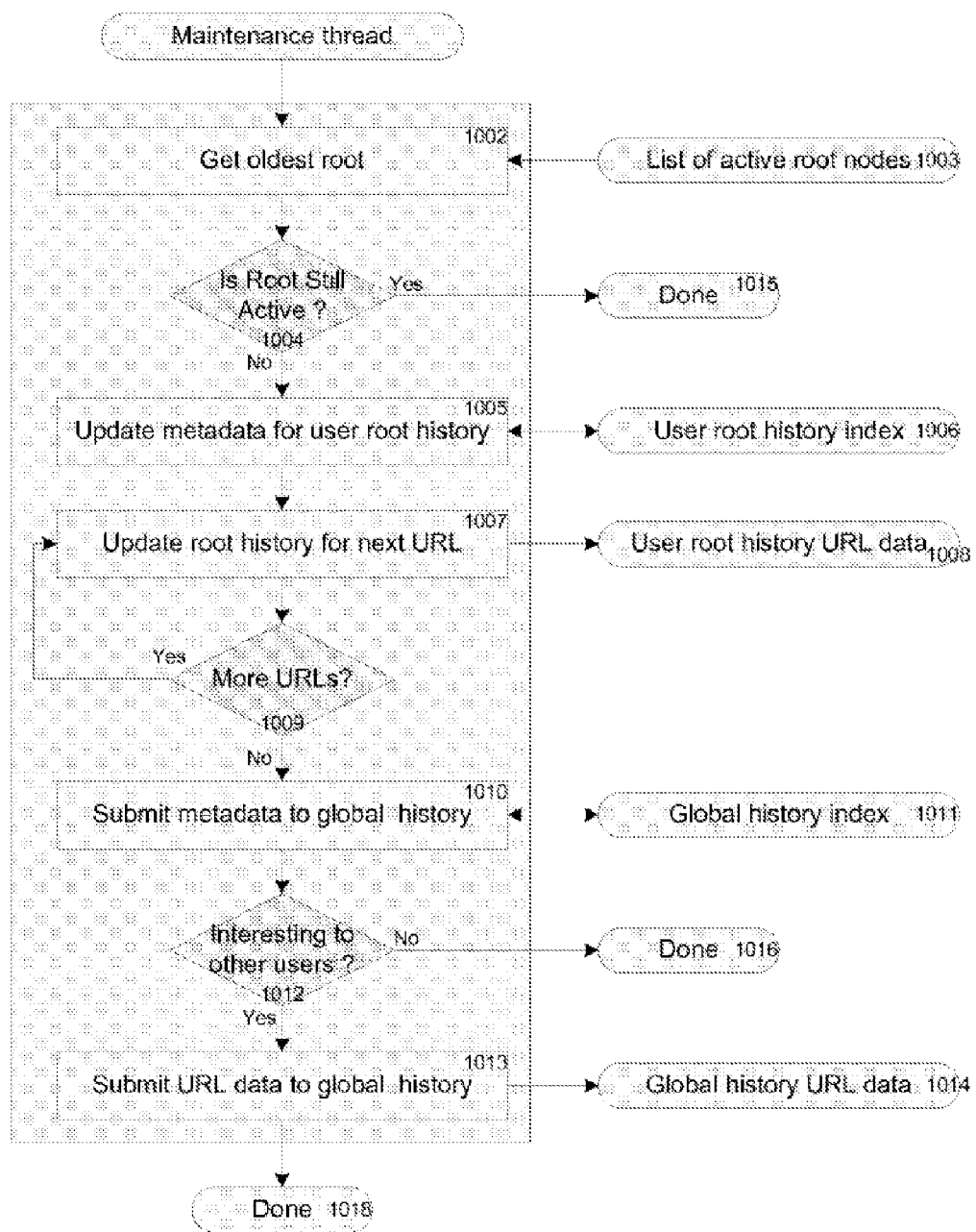
FIG. 10 shows a flow diagram including one potential method for updating a root model in accordance with embodiments of the innovations presented herein.

FIG. 10 shows a flow diagram of an illustrative method for updating a root model, according to various embodiments. For each user, a list of active roots is maintained. These are root pages which are currently being downloaded as determined by the procedures specified earlier [802]. For each page, metadata is maintained such as the root page URL, the number and total size of objects, and the time it was last referenced.

The root entry also includes a list of child nodes associated with the root. This list may contain all the URLs provided from the user and global tracker histories [810, 811], all additional URLs identified by the scanner for this root while downloading the root, and all user application requests that were determined to be part of the download of the root. For each of these child URLs, data is stored such as whether the object was prefetched; whether it was requested by the user application; the size of the object; the order in which it was prefetched; whether it served as a parent for other children; whether the client cache model thought it was in cache; data about the cookies attached to the response; whether it was identified by the scanner and if so, the classification information from the scanner.

When the download of the root page is complete, this data may be used to update the user and global tracker models. This updating may be done by iterating through the list of active roots [1002], beginning with the least recently referenced entry. The determination of whether a root is active was previously described in block [802] of FIG. 8. If the least recently used root is still active, there may be no need to check any more entries, and no further updates are required [1015].

If an entry is finished, its data may need to be incorporated into the user and global models. These models may use substantially the same structure. For example, each may contain a list of root pages with both meta data and a list of entries for its children. The data in these models may be different from the active root page entries [1003], which is intended to record what happened in a single download, while the user and global histories compile information from many different downloads.

According to some embodiments, the first step is to update the user-specific dictionary. A separate history can be maintained for each user. A user-specific history may be more accurate than one shared with other users, as the set of objects delivered for a web page may depend on cookies, browser configurations, and other items that can be unique to each user. A user-specific history may also allow memory to be used more efficiently, as many of the pages a user frequently visits may not be visited by other users. Having this unique content in a user-specific database allows it to be swapped off to persistent storage when the user is not logged onto the network and actively browsing.

The update begins by checking the index of the user-specific history [1005]. If an entry for the root URL does not exist, a new one is started. Otherwise, the old entry is updated with data about the new download, such as incrementing the number of times the page has been downloaded or updating the time that it was last accessed. Each root entry contains a map of child objects. The key for each entry is the child's URL and the payload is information about how that child was used when the page was downloaded. This map is updated by iterating through the list of children in the active root list [1007, 1008, 1009]. The URL of each child is looked up in the history to see if an existing entry for that URL. If so, the entry is updated with information about what happened to this child in this download. If not, a new entry may be added.

The next step is to update the global history [1010]. The size of the global dictionary can be reduced by only storing data about root URLs that have been accessed by multiple users. The global history can keep a record of root URLs which have seen by any client and identifiers for users that have downloaded that root. When the number of different users exceeds a target threshold, it can create an entry for the root in the global model and store data about subsequent downloads. The user list entry for this URL can then be removed. The session updater submits the URL to the global history, which checks if this URL is of sufficient interest [1012]. If so, the global dictionary is updated using the same approach as was done for the user-specific history [1013].

The children of a web page can change with each download: new child URLs are added and others are no longer used. If a child entry is no longer useful, its entry may be removed to allow more efficient use of memory and processing. The root page value for number of times downloaded can be used as a sequence number to record the last time an entry was useful. A child entry is useful if the user application requested the URL or if the scanner incorrectly identified the URL as a candidate, in which case the history entry can be used to prevent an unnecessary prefetch.

If the entry was useful in either way, the root sequence number is stored as the child's LastUsed value. This allows easy pruning of the child entries. If the LastUsed value is less than the current sequence number by more than a set threshold, the child entry is no longer useful and can be removed from the map. This pruning might be done on a maintenance thread, or when the children of a root page are checked at the start of a page [809]. Similarly, root pages may need to be removed from the user-specific and global dictionaries to make space for newer entries. In some embodiments, a least-recently-used algorithm is used for this purpose.

Figure 11:
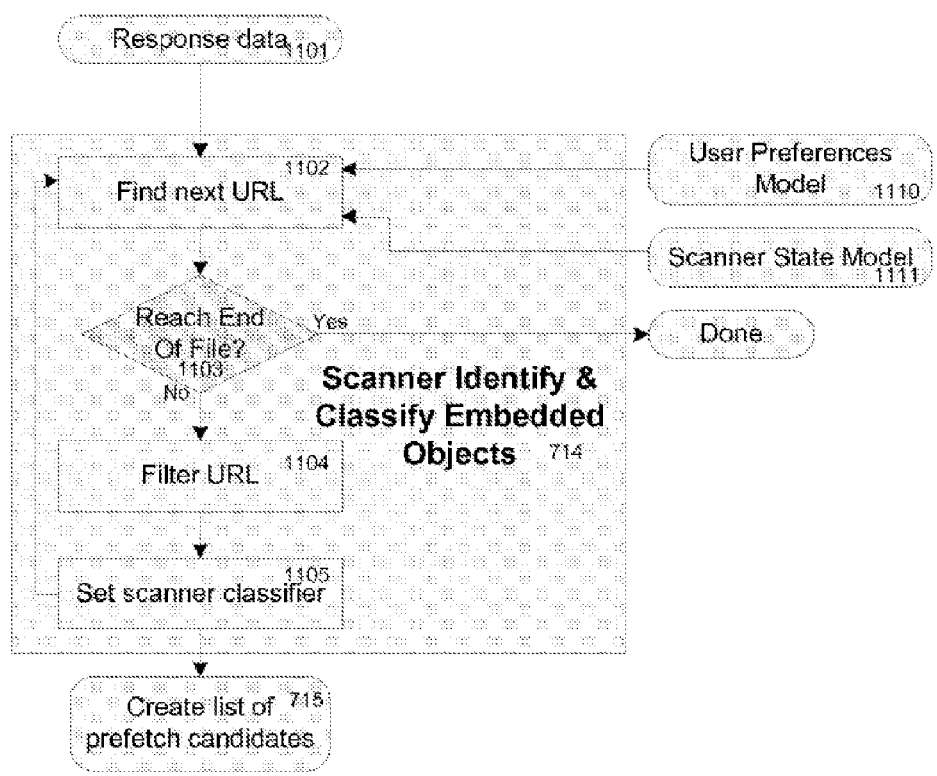
FIG. 11 shows a flow diagram associated with an object scanner in accordance with embodiments of the innovations presented herein.

FIG. 11 shows a flow diagram of an illustrative method by which the scanner identifies and classifies child objects, according to various embodiments. For example, embodiments of the flow diagram further describe techniques illustrated by block [714] of FIG. 7 above. Embodiments of the scanner is a format-specific parser that is aware of the tokens and syntax of the file formats that may contain references to URLs that will be downloaded after the parent is downloaded. Some of these formats include HTML, XML, JS, and CSS.

A goal of the scanner may be to identify all of the URLs that will be requested and to classify each URL in a way that allows an accurate estimate of the probability that it will be used. The classification is a tool used to reduce the number of downloads of objects that are not requested by the user application while still prefetching the objects that are requested. Various techniques that improve the ability to identify and classify URLs are presented below in the "Selective Prefetch Scanning Embodiments" section of this disclosure, and have been presented in U.S. patent application Ser. No. 12/172,917, titled "METHODS AND SYSTEMS FOR JAVA SCRIPT PARSING," filed on Jul. 14, 2008, which is hereby incorporated by reference for any and all purposes.

The scanner receives the response data [1101] and uses these parsing techniques to find a reference to a URL that might be requested by the user application after it receives this response. The selection of objects to download may depend on user-specific factors such as the type of browser being used and its configuration, current display capabilities, whether cookies or HTTPS are supported, and other factors. The user preferences model [1110] can specify these factors so that only the correct objects are downloaded. One way to obtain this information is to query the user machine. If the client side optimizer is located on the same machine as the user application, it may be able to query the machine and application configurations. Another way to obtain this data is to record the conditions associated with a URL reference, such as whether it was within a NOSCRIPT tag, in the classifier that is associated with the prefetch request for this child. This classifier can then be evaluated when the node state is updated [619] to determine the user application configuration.

The scanning of the response data is also assisted by the scanner state model [1111] which contains information obtained from parsing previous files that can improve the identification or classification of URLs. A network optimizer usually does not access data in the same way as the user application. If for example an HTML file includes JS or CSS files, the user application will download all of the relevant files and have access to all referenced data at the time that it parses each section. In contrast, it may not be efficient for the optimizer to collect all this data before parsing, as it consumes resources and introduces delays. As a result, the network optimizer may not have access to data that is essential to parse the response data efficiently.

This problem can be mitigated by storing information when parsing one file that may be useful in parsing future files. This data is user-specific and may be useful even after the root page has finished downloading. For example, a style sheet or java script may be downloaded once but used in rendering many different pages. Information about these objects may be stored so as to assist in the parsing of future files. Rather than store the entire file, only the specific data is stored that is useful in identifying and classifying URLs in future files. One example is the CSS parser described below in the "Selective Prefetch Scanning Embodiments" section of this disclosure. Certain classes and class rules used by an HTML file are stored, so that when a CSS file is parsed, only the relevant objects are prefetched. The scanner state model [1111] contains this data for a specific user.

After the scanner has identified a URL, it may be efficient to apply various filters [1104] that can reduce the number of URLs that are prefetched but not requested by the user application. One example is to verify that the URL domain and path strings are in accordance with HTTP syntax. Another example is to screen out protocols that might not be supported by the prefetching system such as HTTPS. Although certain embodiments may not support HTTPS, it is to be understood that any embodiment describe herein as functioning with HTTP would also function with HTTPS where functionality for dealing with secure aspects of HTTPS is also part of a system. Any reference to HTTP therefore applies equally to decrypted HTTPS, or to HTTPS that the system is capable of understanding.

The next step is to set the scanner classifier for the child object, which describes the context in which the child URL was identified. The contextual data may include values such as the type of file (HTML, CSS, JS, XML, etc.) in which the URL was identified; the structural elements that were being parsed, such as an IFRAME tag or a Java documentWrite( ) the conditional expressions that may be controlling this block, such as a NOSCRIPT tag; whether the domain and/or protocol were included in the reference or had to be inferred from the context; and other values that may be relevant to the parser implementation, such as the types of Java operators that had to be parsed in order to identify the URL.

The scanner classifier is used in several places in the optimizer. It will be used in creating the list to prefetch candidates [715] to estimate the probability that an item identified by the scanner will be requested by the user application. It may be stored in the user or global histories and used in building a model of the URL to estimate whether it will be used in subsequent requests of the root page [1013, 711]. It may be used to build the user preference model [1110]. In some embodiments, items that are identified and classified by the scanner are then sent to the module which creates the list of prefetch candidates (e.g., as described above with reference to block [715] of FIG. 7).

Figure 12:
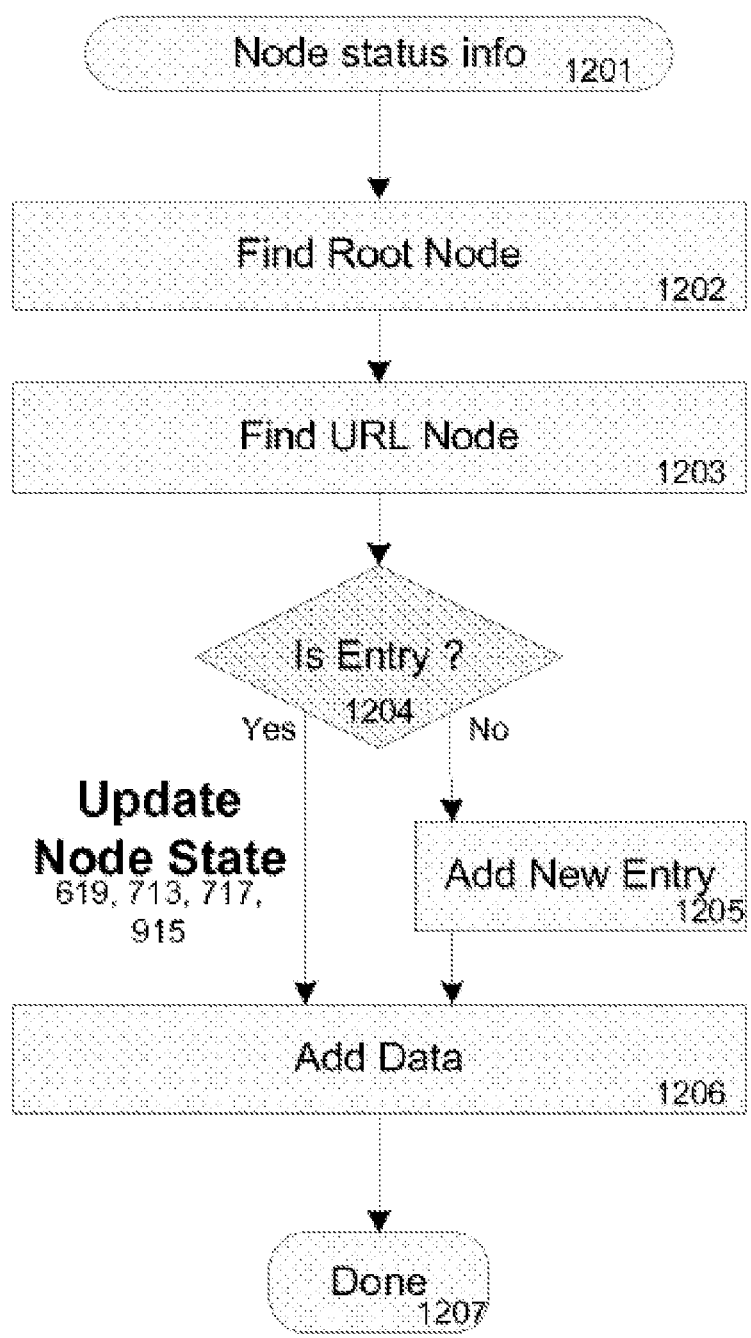
FIG. 12 shows a flow diagram associated with updating nodes in a root tree in accordance with embodiments of the innovations presented herein.

FIG. 12 shows a flow diagram of an illustrative method for creating and updating child nodes in active root trees, according to various embodiments. The child nodes may contain data about a URL that was prefetched or requested in conjunction with the download of a root page. The same URL might be a child node for multiple root URLs, and its entry data could be different in each case because of different usage patterns. The active root entry is created when the root page is identified [802]. If this URL is found in the history, child nodes are created at this time for URLs that were requested or prefetched in prior downloads of the page [809]. If a URL is requested by the user application and determined to be part of a root page [710], an entry is added to the active root page for this new child node if one does not already exist. A child node is also created if the scanner identifies and URL that is not already included in the active root page [915,919].

The child node tracks what happens to this object during a single download of the root page. This data is primarily used to update the user-specific and global models [1007, 1013] to improve the prefetching performance the next time that the root page is requested. The data in the child root node can also be used to build the user preferences model [1110] and scanner state model [1111], as it provides a convenient place to store the data after scanning and then adjust the model once the results are known via the state update [619].

Some of the child node data is established when the node is created, such as the URL and how it was identified. Other values are added at various points during processing. The scanner stores its classification data if/when it identifies the URL. The HTTP parser might add information about whether cookies were dropped in the response header. Notably, embodiments then upload the result data from the client optimizer [619], which provides data about the request from the user application even when this request does not reach the server because it was handled via a prefetched response.

When a child node is added or updated in the active root trees, the first step may be to find the root node entry [1202]. This entry contains a map of the child nodes, which is then searched for the child node's URL [1203]. A new entry can be created if it is not found [1204, 1205]. The new data may then be added [1206].

Figure 13:
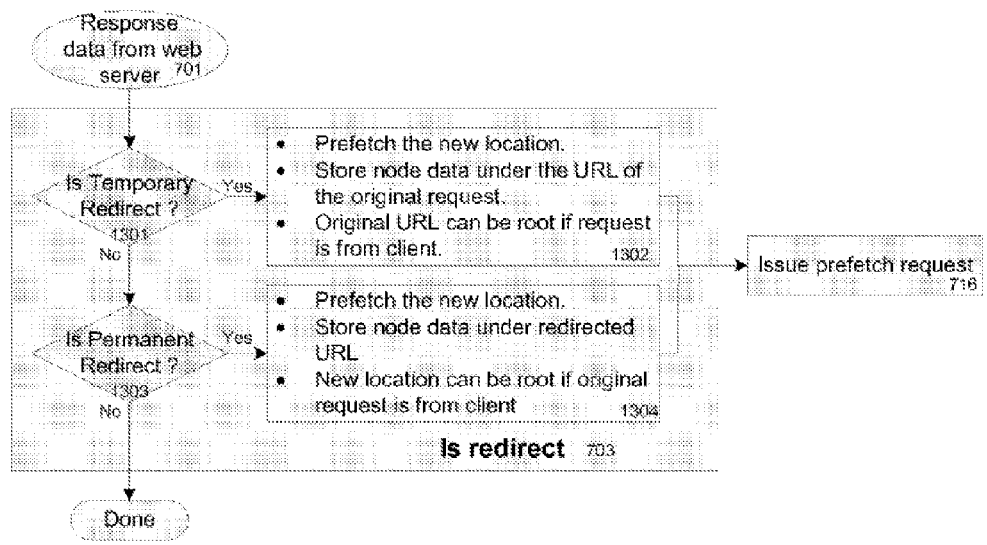
FIG. 13 shows a flow diagram associated with HTTP redirection in accordance with embodiments of the innovations presented herein.

FIG. 13 shows a flow diagram of an illustrative method for handling HTTP redirection, according to various embodiments. For example, embodiments describe techniques discussed above with reference to block [703] of FIG. 7. Redirection is indicated by the HTTP response header via the response code for permanent (301) or temporary (302, 303) redirection of the requested URL. Redirection provides an opportunity to save a RTT by prefetching the new location.

It also affects how the root nodes are determined [710]. If the redirection is temporary [1301, 1302], the data for the new response will be stored under the root node of the original request. In determining whether a response is a root URL [710], the source of the original response (user application versus prefetched) is used. If the redirection is permanent [1303, 1304], the new location should be used as the root page if the original request is from the client and the response is otherwise determined to be a root page [710].

For some web sites or applications, the root page may be cacheable, but contains children that are requested each time the user application requests the page. The user application will request the root page and receive a cached copy from the local browser cache. The optimizer will never see this request, and will not be able to scan the response for children to prefetch or use the tracker to prefetch children identified in previous downloads. This problem can be solved by modifying the response header on root pages so that the optimizer will be notified if the root page is requested, which then gives the optimizer the opportunity to prefetch the children.

Figure 14:
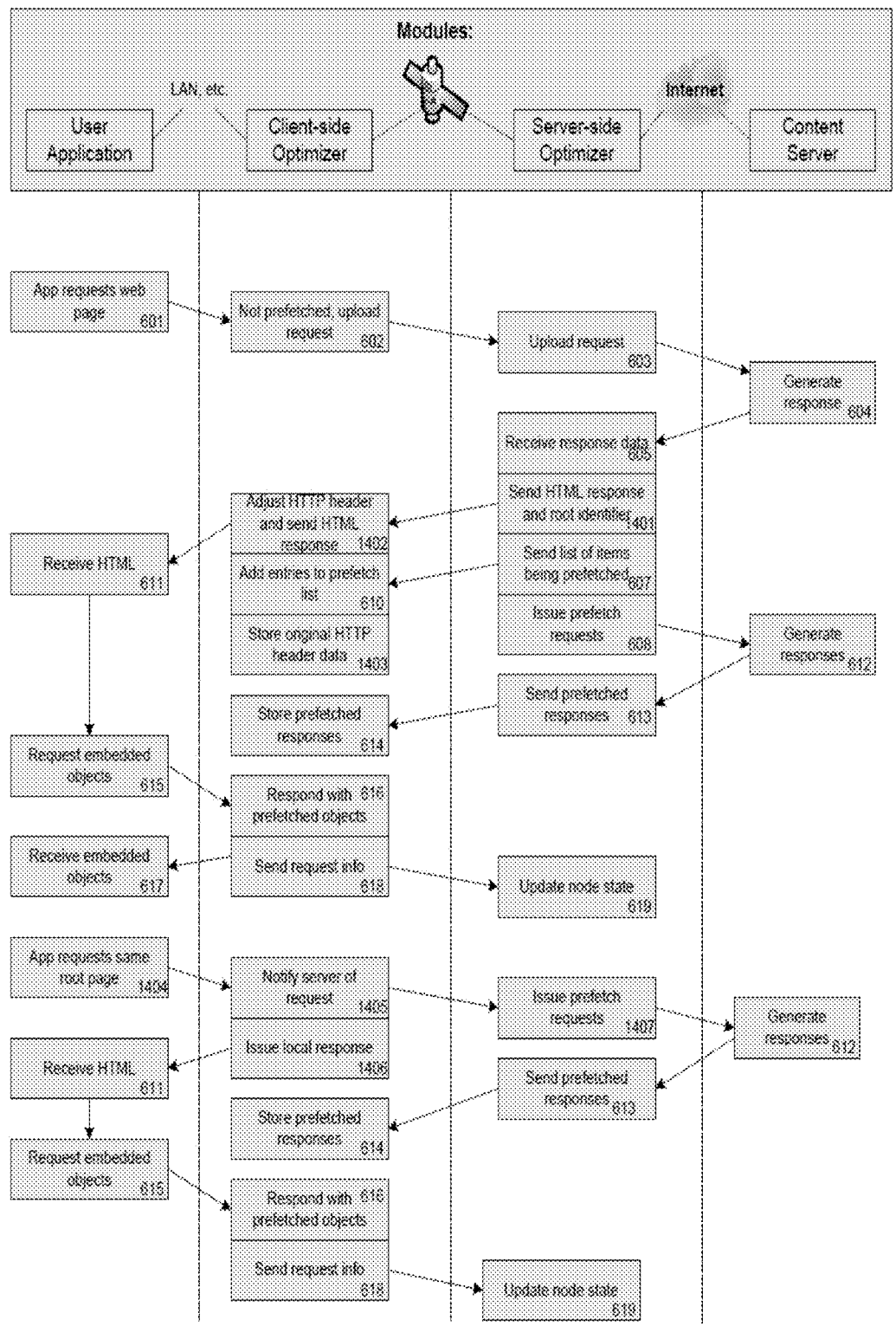
FIG. 14 shows a prefetching flow diagram in accordance with embodiments of the innovations presented herein.

FIG. 14 shows a flow diagram of an illustrative method for prefetching that supports HTTP redirection, according to various embodiments. For example, embodiments include adaptations of portions of FIG. 6 and FIG. 13, above. The user application request is uploaded to the server and a response is received as before [601-605]. If this response is identified as a root page [710], a flag is sent along with the HTML response [1401] indicating that this is a root page. When the client optimizer receives this response, it checks the caching instructions in the HTTP header [1402]. If the response is cacheable, it modifies the HTTP expires time field to set a short lifetime so that the user application will issue a request for the page rather than use the local copy without checking with the content server.

The client optimizer stores the original expires time [1403] so that it can provide the correct behavior if it receives a subsequent request for the same root page. If the application then requests the same root page [1404], it will typically send an "If-Modified-Since" request for the page. The client optimizer checks the stored value of the original expires time. If the object is still fresh, it responds 'not modified' to the request. It then uploads a high priority message to the server indicating that the root page has been requested [1405]. If the object is no longer fresh, the client response is uploaded to the server, as would have happened if the header had not been modified, and normal prefetching will occur.

The optimizer server receives the notification [1407] and uses the tracker history to prefetch objects that will be needed by the user application to process the root page. There is no need to scan the object, as the object has not changed since the last download, so the tracker history has all the children that would have been identified by the scanner.

The client optimizer can also implement a cache to protect against the case where the application request [1404] does not include the "If-Modified-Since" directive when requesting expired objects. In this embodiment, the client optimizer caches copies of the root pages received at [1402], and then uses them to fulfill the requests [1405, 1406].

A number of variations and modifications of the disclosed embodiments can also be used. For example, factors used to determine whether to forward a prefetched object may be used outside the website and/or Internet context. For example, the prefetching technique may be used to determine which terminals to download an object from in a peer-to-peer network environment. In addition, the prefetching technique may be used on various network types, for example, a satellite network, a mobile device network, etc.

Further, in some embodiments, some of the functionality described herein with respect to a two-part proxy may be implemented as part of web browser functionality. For example, as described above, some of the URL tracker functionality affects server-side prefetching according to feedback from the client side. It will be appreciated, however, that much of the same functionality may be used to maintain prefetch lists for use by a browser. For example, when a browser issues a request for an object (e.g., a webpage), the browser may also issue requests for the list of prefetch objects at substantially the same time, according to techniques described above.

Selective Prefetch Scanning Embodiments

As will be appreciated from the above description, prefetching systems may seek to request substantially all the objects that will subsequently be requested when a web page is rendered. Notably, much of the information about those objects may be unknown. For example, the exact set of objects to be ultimately requested by a client may not be known for certain in advance for a number of reasons. This uncertainty may impact the outcome of prefetching cost-benefit analyses, thereby affecting the effectiveness and efficiency of prefetching systems.

As discussed above, the prefetching cost-benefit may be analyzed as a function of a number of factors, including probability of use, round-trip time (RTT), prefetch time, available bandwidth, object size, etc. Illustrative equations to this effect are described above with reference to FIG. 2. These various factors may be weighed to determine whether prefetching one or more objects is efficient, for example, as compared to downloading the object only when it is actually requested by the client.

Thus, a decision of whether to prefetch an object may be a function of certain variables, and determining the values of those variables with any certainty may be difficult. For example, simply pre-requesting as much content as possible may yield undesirable results. Speculative prefetching of content which is not ultimately requested by the client may carry both the consequence of consuming bandwidth which in turn delays the return of actual content requested by the client as well as a monetary cost for transmitting such extraneous content. Therefore, to successfully prefetch content without significantly increasing the amount of extraneous information, it may be desirable for a system to more accurately predict the requests which a client will actually generate. Less speculation may yield greater accuracy, and, thus, a more accelerated and less expensive experience for the end user.

As discussed above, in response to the request, a response parser may receive a response from a requested website. The response may include embedded objects (e.g., HTML, XML, CSS, Java Scripts, etc.) that may be needed to render a requested web page. In some cases, the embedded objects act as object containers. As used herein, object containers generally refer to types of objects that contain multiple embedded (e.g., referenced, in-line, etc.) objects (referred to herein as "objects" in certain contexts, as "container objects," etc.), such as CSS files.

Object containers may be used according to certain container rules. For example, a CSS file shared among multiple webpages may include references to many objects, only a portion of which are used to render any one of the webpages. Suppose a CSS file is used to maintain a number of content objects for a website, including all the various icon images, background images, Flash animations, etc. used throughout the site. Some may be used only on certain pages, others may appear only when a mouse pointer is placed over a certain portion of a page, etc. Typically, web browsers may be configured to request only the portion of the objects in the object container needed to render a particular page according to certain container rules associated with the page.

It is worth noting that other types of object containers are possible, or that other characteristics may be applied as container rules. In some embodiments, a user preferences model (e.g., as described above with reference to block [1010] of FIG. 10) is used to improve scanner prefetching. For example, the user preferences model may indicate that a user is making requests using a particular type or brand of browser, with a browser having a certain configuration, from a user machine having certain display or other characteristics, etc. Only a portion of the objects in an object container may be requested by the browser according to those characteristics (e.g., a CSS rule may indicate a subset of objects in a CSS file as applicable to requests from a certain type of browser). Similar functionality may apply to other protocols or file types, such as JavaScript files, etc.

Typically, content may be requested, via HTTP, by issuing requests for discrete objects where each object is uniquely identified via a URL. To render the content to the client, an individual request may be generated for each unique object that is required for that rendering. A webpage, for instance, may include multiple HTTP requests in order to be rendered. Any given webpage might include a single request for the HTML code plus an additional request for each unique image associated with that page. The webpage may also contain additional code located on additional pages, each accessed through an additional request. Each request may carries the unique URL associated with the content being requested and these URLs may be contained in the responses to previously requested content such as the initial HTML code, CSS code, or other content type (e.g., JavaScript).

One way to identify what requests a client will likely issue is to parse the previously requested content and locate the URLs which they contain. These URLs may then be prefetched on behalf of the client with the assumption that they will ultimately be requested by the client. However, not all URLs contained in the response content will actually be requested by the client. This approach may be considered overly speculative. While the approach may achieve an accelerated end user experience, it may also be sub-optimal, resulting in significant amounts of prefetched content which is not ultimately requested by the client.

To improve the accuracy of prefetching may involve more exact modeling of the response data to more accurately predict what will be requested by the client as a consequence of that response data. Some embodiments exploit the container rules associated with object containers. Certain embodiments and examples are described herein with specific reference to CSS. It will be understood that CSS is intended only to be one illustrative type of object container associated with container rules. As such, specific references to CSS may be broadly construed to apply (with modifications known in the art, as needed) to any other type of object container or container rules.

For example, modern web content often makes extensive use of CSS. CSS works by defining 'rules' which specify how content will be visually or otherwise rendered to the client. These rules may be a collection of one or more properties which can include URLs to other content such as background images, etc. When an HTML object applies a CSS rule, it may request URLs according to satisfying that specific rule. In practice, these CSS rules may often define collections of objects and may be stored in one or more CSS files.

When HTML documents desire a specific set of CSS rules, corresponding CSS files may be requested and the rules may be applies, accordingly. However, it is very common for the CSS files to define more rules than are actually invoked by the associated HTML document because many different HTML documents often refer to the same CSS file. As such, simply parsing CSS documents and requesting the URLs from each rule may result in over-prefetching of content and may offer little or no improvement over existing prefetching approaches.

Embodiments described herein seek to more precisely predict client requests for content, not only by identifying the URLs in the response content, but also by predicting which CSS rules will be applied to that content. Prefetching URLs located in CSS rules may then be restricted to the rules which the client will apply and while the URLs located in rules which the client will not apply may be avoided (i.e., not prefetched).

Furthermore, many properties defined within any given CSS rule can indicate how the rule will be applied and this can affect if and how the URLs contained within that rule is likely to be requested. For example, the pseudo selector ":hover" is applied to a rule such that the rule might not be requested until the client's mouse pointer hovers over an HTML object which applies that rule. This is commonly referred to as a "fly over" or "roll over" and is often used to load alternative graphics in order to change the visual appearance of an HTML object when the user hovers over it. These and/or other types of rules may not be immediately applied, if at all (e.g., the client may never hover over the relevant HTML object). As such, it may be desirable to avoid prefetching corresponding URLs contained in those rules, despite the fact that the HTML does apply that CSS rule.

Other CSS properties may also affect if and how URLs found in rules will be requested. For example, the CSS property "display" can be defined as "none." When a rule containing this definition is applied to an HTML object, that object may not be attached to the browser's Document Object Model (DOM). Therefore, the rule, despite being referenced and applied, might not request URLs associated with that rule. Of course may other container rules (e.g., CSS property definitions) may exist, and each may affect how the client will request data. As such, embodiments may not only consider which rules will be applied, but also how the client's requests may be affected by the application of those rules.

Some embodiments are designed to be lightweight with regard to both memory and CPU usage. It will be appreciated that CSS rules which are to be applied to HTML content are often defined in response data which is located closely (in time) to the HTML content which uses it. Embodiments may exploit this characteristic to reduce the amount of memory required to maintain records of which CSS rules have been encountered as well as which CSS rules will be applied.

Figure 16:
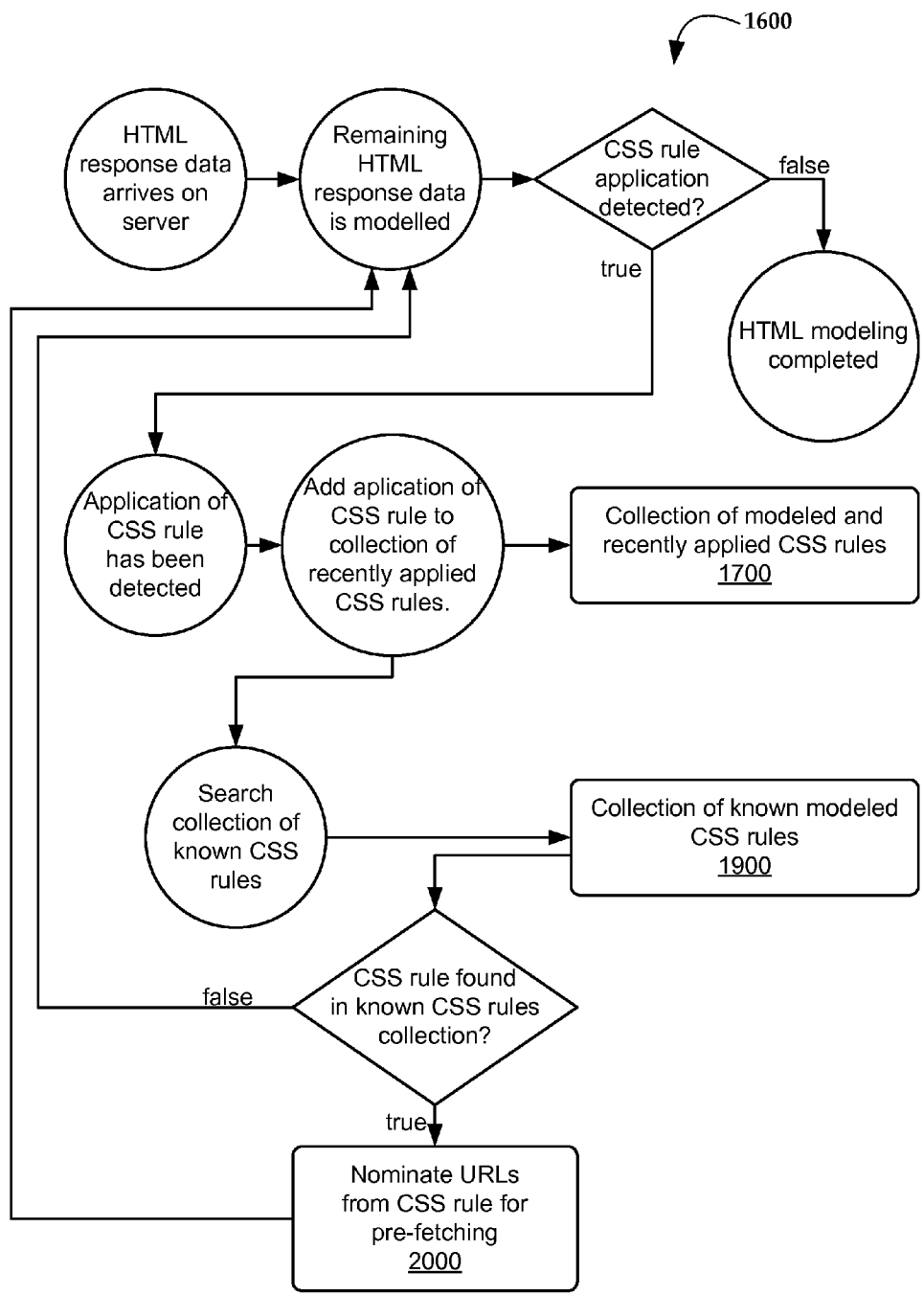
FIG. 16 shows a flow diagram associated with HTML parsing and modeling in accordance with embodiments of the innovations presented herein.
Figure 17:
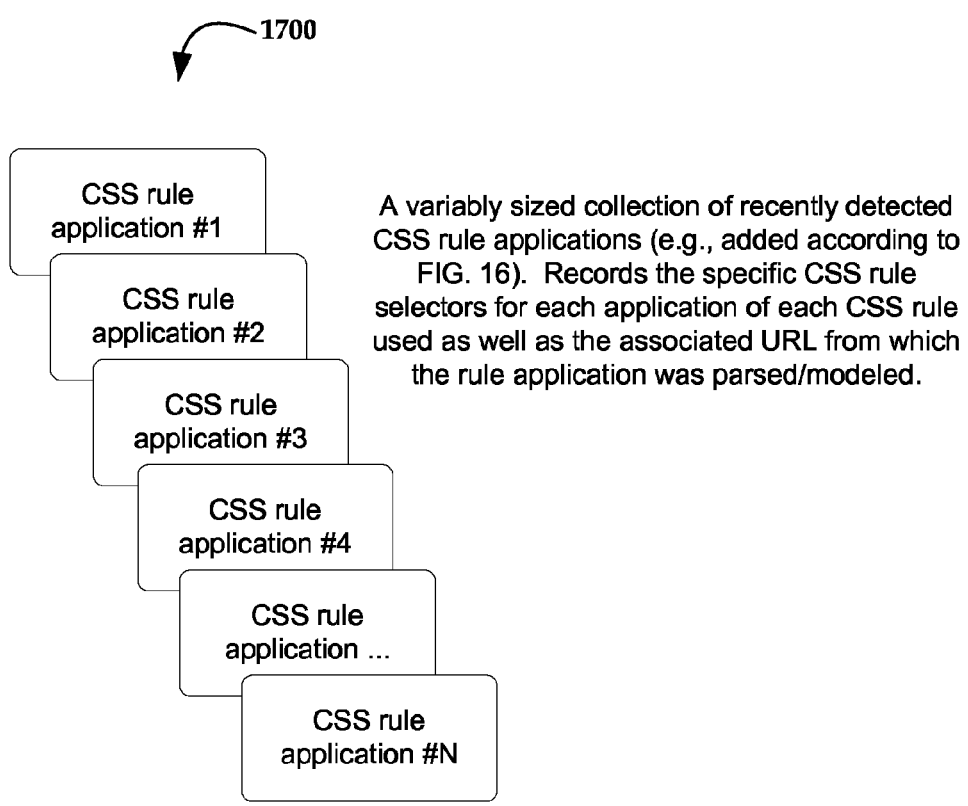
FIG. 17 illustrates a collection of recently applied references in accordance with embodiments of the innovations presented herein.
Figure 18:
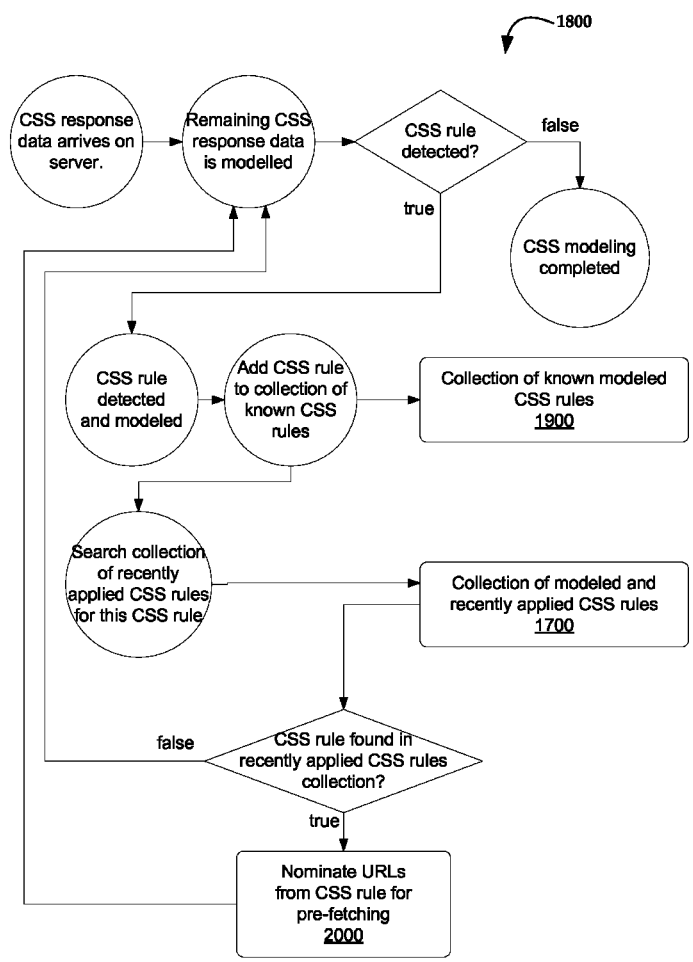
FIG. 18 shows a flow diagram in accordance with embodiments of the innovations presented herein.
Figure 19:
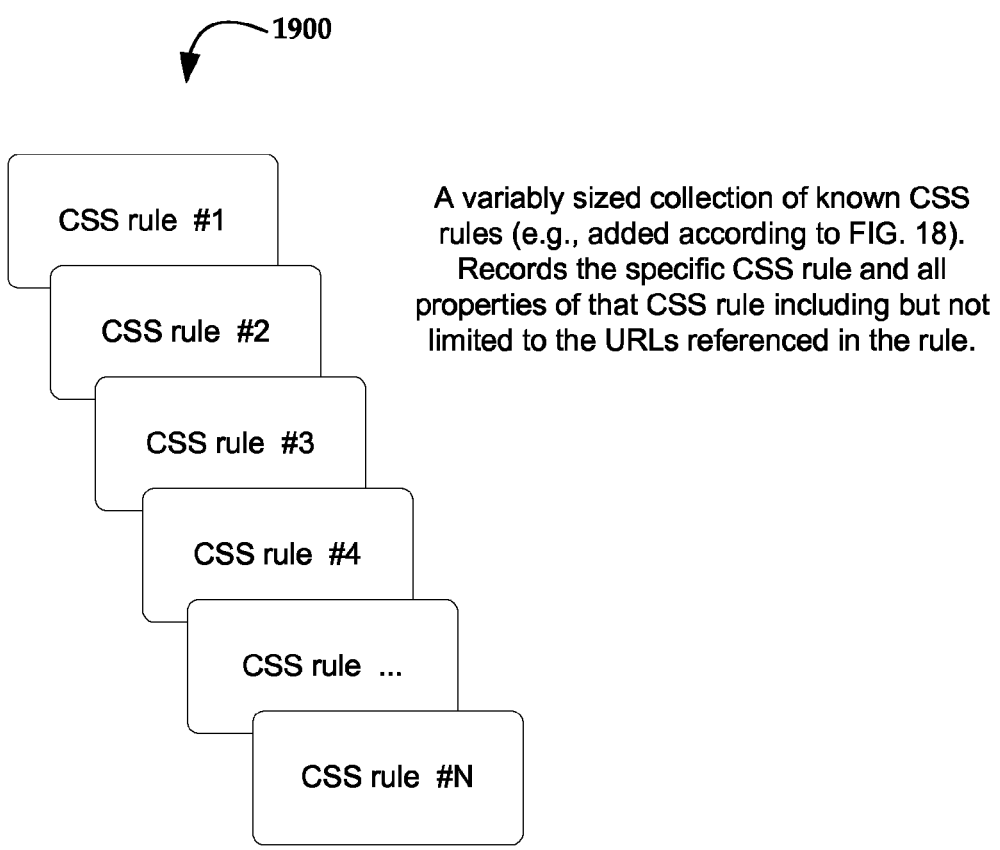
FIG. 19 illustrates a collection of known references in accordance with embodiments of the innovations presented herein.

Further, CSS content may be encountered before or after the HTML content which references it. As such, certain embodiments include at least two separate parsers/modelers, each specializing in format-specific parsing of HTML and CSS (e.g., as illustrated in FIGS. 16 and 18, respectively). The independent parser/modelers may update two associated collections of information collected by these parser/modelers (e.g., as illustrated in FIGS. 17 and 19, respectively). For example, FIG. 17 shows a collection of recently modeled specific instances of applied CSS rules detected in HTML, as updated by a format-specific HTML parser/modeler (e.g., as shown in FIG. 16). FIG. 19 shows a collection of previously modeled CSS rules as they are detected and modeled in CSS code, and as updated by a format-specific CSS parser/modeler (e.g., as shown in FIG. 18).

Notably, the HTML parser/modeler of FIG. 16 may have access to the collection of known CSS rules of FIG. 19, and the CSS parser/modeler of FIG. 18 may have access to the collection of recently applied CSS rules of FIG. 17. As such, each parser/modeler may be able to nominate CSS rules for prefetching independently of the each other. Further, given the same CSS and HTML data, they may be configured to nominate the same set of CSS rules for prefetching (e.g., regardless of the order of parsing/modeling of that CSS data and HTML data). For example, if the HTML parser/modeler parses HTML data before the CSS parser/modeler parses the CSS data, the results will be the same as if the opposite order occurs. Moreover, in some embodiments, both parser/modelers are configured to parse their respective HTML data and CSS data substantially simultaneously (e.g., or in partially overlapping time) and still produce the same set of CSS rules nominated for prefetching. Therefore, the same deterministic results may be produces according to various embodiments, regards of the sequence of appearance and/or processing of HTML and CSS data.

Figure 15:
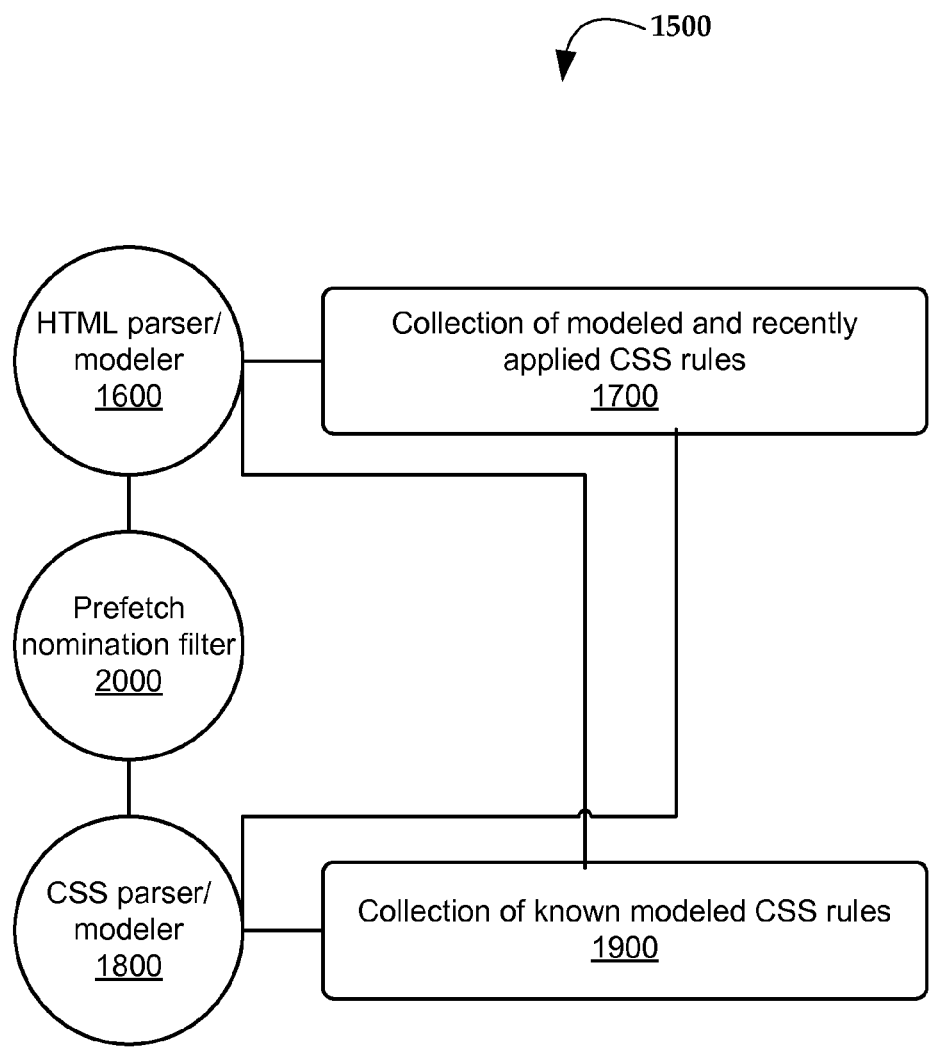
FIG. 15 shows a prefetching flow diagram including CSS prefetching in accordance with embodiments of the innovations presented herein.

Turning to FIG. 15, a flow diagram is shown of a method for CSS prefetching, according to various embodiments. The method illustrates how an HTML parser/modeler 1600 and a CSS parser/modeler 1800 parse and/or model HTML data and CSS data, respectively. It further illustrates that HTML parser/modeler 1600 interacts with the collection of recently applied CSS rules 1700 for writing, as well as the collection of known CSS rules 1900 for reading. Similarly, it illustrates that CSS parser/modeler 1800 interacts with recently applied CSS rules 1700 for reading as well as known CSS rules 1900 for writing. In addition CSS parser/modeler 1800 and HTML parser/modeler 1600 have access to a prefetch nomination filter 2000 for final filtering of the CSS rules which they have nominated for prefetching.

For example, HTML parser/modeler 1600 detects each instance of the application of any given known CSS rules 1900. CSS parser/modeler 1800 detects and models each CSS rule definition contained in CSS data. A collection of recently applied CSS rules 1700 is maintained as detected by the HTML parser/modeler 1600. A collection of known CSS rules 1900 is also maintained as detected by CSS parser/modeler 1800. Filtering for rejecting or approving the prefetch nominations of the HTML parser/modeler 1600 and CSS parser/modeler 1800 may then be implemented by the prefetch nomination filter 2000. Each of these functional components may be discussed in turn.

FIG. 16 shows a flow diagram of functionality of an illustrative HTML parser/modeler 1600, according to various embodiments. For example, the flow diagram illustrates how HTML data is parsed and modeled in each specific instance where the content of that HTML data applies a CSS rule. Further the flow diagram illustrates how and when the HTML parser/modeler 1600 adds these instances to the collection of recently applied CSS rules 1700, and the functionality to gain read access to the collection of known CSS rules 1900. Further, the flow diagram illustrates how and when the HTML parser/modeler 1600 may nominate CSS rules to the prefetch nomination filter 2000 for prefetching.

In some embodiments, the HTML parser/modeler 1600 parses and models HTML data in order to detect the application of CSS rules. For each application of each CSS rule, if that application is unique, it is added to the collection of recently encountered application of CSS rules (e.g., the recently applied CSS rules 1700). In addition, the collection of known CSS rules 1900 may be accessed for reading to determine if the specific CSS rule being applied is already known. If the known CSS rules 1900 is found to contain the specifics of the CSS rule, that rule may be nominated for prefetching and delivered to the prefetch nomination filter 2000 for further filtering and final determination of whether to prefetch the CSS rule's URLs. Parsing/modeling of the HTML data may then resume until all of the HTML data has been completely processed.

FIG. 17 shows an illustrative collection of recently applied CSS rules 1700, according to various embodiments. For example, the recently applied CSS rules 1700 are maintained in a container for searching by CSS parser/modeler 1800 and for updating by HTML parser/modeler 1600. In some embodiments, the recently applied CSS rules 1700 are a collection of recently applied CSS rules as detected by HTML parser/modeler 1600. It is accessed by HTML parser/modeler 1600 as well as recently applied CSS rules 1700 to determine if any given CSS rule has been recently applied in any recently processed HTML data (e.g., processed by HTML parser/modeler 1600).

In some embodiments, an amount of memory assigned for use by this container object can be predefined or dynamically updated in order to contain fewer or more entries as is determined optimal by the system. Ultimately, when the maximum memory allotment is reached, the oldest entries are deleted in order to provide space for newer entries. This provides a method for easily removing older entries thereby only maintaining more recent entries automatically. This collection contains the 'selectors' used to apply a given CSS rule, various attributes about the HTML object which has applied the CSS rule, the URL of the HTML data which contains this HTML object as well as the URLs of any CSS data which is used/referenced by that HTML data.

FIG. 18 shows a flow diagram of functionality of an illustrative CSS parser/modeler 1800, according to various embodiments. For example, the flow diagram parses CSS data and models each specific CSS rule contained in that data. The flow diagram illustrates how and when the CSS parser/modeler 1800 adds these rules to the collection of known CSS rules 1900, and the functionality of gaining read access to the collection of recently applied CSS rules 1700. The flow diagram also illustrates how and when the CSS parser/modeler 1800 will nominate CSS rules to the prefetch nomination filter 2000 for prefetching.

In some embodiments, the CSS parser/modeler 1800 parses and models CSS data in order to detect the definition of CSS rules. Each CSS rule detected is recorded and placed in the collection of known CSS rules 1900. The collection of recently applied CSS rules 1700 may then be accessed to determine if this CSS rule has been recently applied by any HTML data parsed/modeled by HTML parser/modeler 1600. If this CSS rule has been recently applied, the CSS rule may be nominated for prefetching and delivered to prefetch nomination filter 2000 for further filtering and final determination of whether to prefetch the CSS rule's URLs. Parsing/modeling of the CSS data may then resume until all of the CSS data has been completely processed.

FIG. 19 shows an illustrative collection of known CSS rules 1900, according to various embodiments. For example, a collection of known CSS rules 1900 is maintained in a container for searching by HTML parser/modeler 1600 and for updating by CSS parser/modeler 1800. A collection of known CSS rules 1900 is detected by CSS parser/modeler 1800. It is accessed by HTML parser/modeler 1600 and CSS parser/modeler 1800 to determine if any given CSS rule has been modeled and its properties are known.

In some embodiments, an amount of memory assigned for use by this container can be predefined or dynamically updated in order to contain fewer or more entries as is determined optimal by the system. When the maximum memory allotment is reached the least recently used entries can be persisted to an external storage medium if available or deleted so that newer entries can be added. The collections contains the various properties of each CSS rule added including the 'selectors', each CSS attribute/property as well as the URL of the CSS data in which it appeared.

Figure 20:
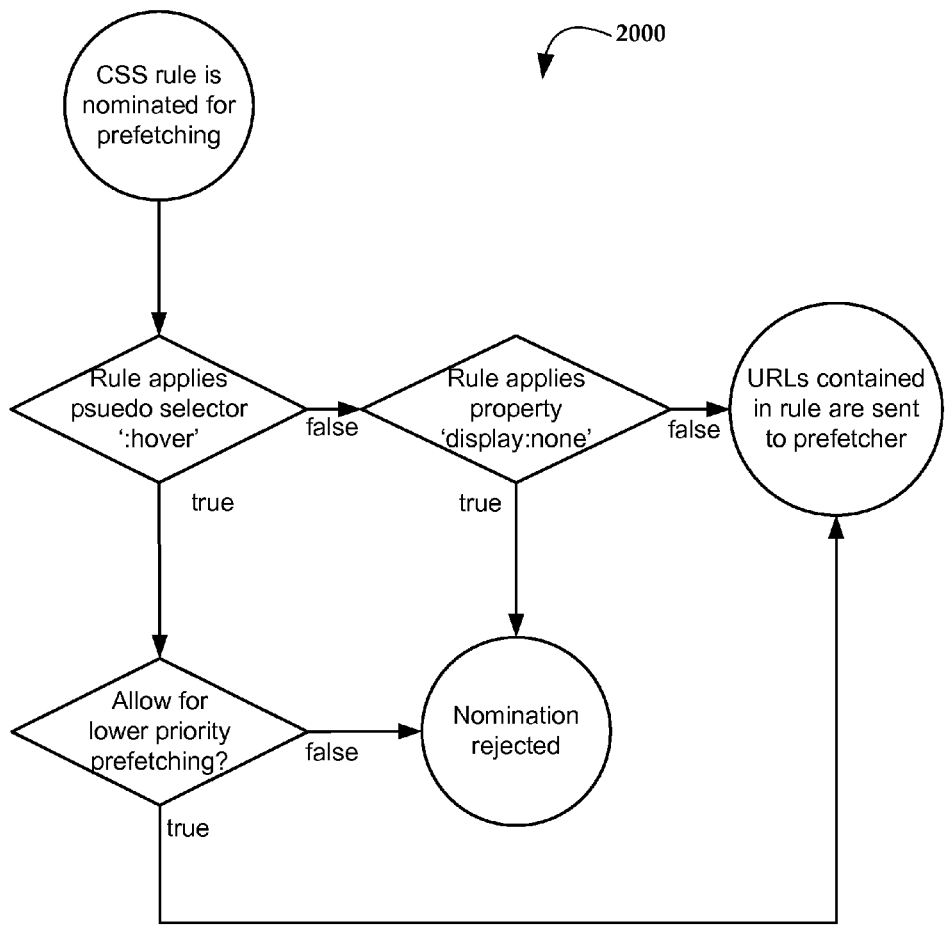
FIG. 20 shows a flow diagram including a prefetch filter in accordance with embodiments of the innovations presented herein.

FIG. 20 shows a flow diagram of an illustrative prefetch nomination filter 2000, according to various embodiments. For example, the prefetch nomination filter 2000 filters CSS rules which have been nominated for prefetching by HTML parser/modeler 1600 and CSS parser/modeler 1800. In some embodiments, upon nomination of a CSS rule for prefetching by either HTML parser/modeler 1600 or CSS parser/modeler 1800, a filtering process is performed to either reject the nomination or to approve that nomination and submit the URLs of that CSS rule to the system which actually executes the HTTP prefetch.

The prefetch nomination filter 2000 may deal specifically with the properties of the CSS rule. If any properties of the CSS rule are defined such that it is known to prevent the URLs of that rule from being requested by the client, then the nomination is rejected. In addition, if any properties of that CSS rule are defined which can reduce the probability of that CSS rule actually being applied by the client then that CSS rule may be either rejected or, alternatively, given a lower priority for prefetching such that it is prefetched only after higher priority CSS rules are submitted for prefetching. An example of this later condition is the CSS pseudo selector ':hover' which can prevent the client from applying the CSS rule until the object to which that rule is applied is 'hovered' over.

It will be appreciated that the selective prefetch scanning described herein may be used with other prefetcher functionality described herein. For example, the container rules (e.g., as applied by the prefetch nomination filter 2000) may be used to affect prefetch probabilities, which may then be factored in to the cost-benefit analyses described above (e.g., with reference to FIG. 2). Thus, the various techniques described herein may affect what is prefetched, what is pushed to the user, etc.

Hierarchy Determination Embodiments

As will be appreciated from the above description, prefetching systems may seek to request substantially all the objects that will subsequently be requested when a web page is rendered. Notably, much of the information about those objects may be unknown. For example, the exact set of objects to be ultimately requested by a client may not be known for certain in advance for a number of reasons. This uncertainty may impact the outcome of prefetching cost-benefit analyses, thereby affecting the effectiveness and efficiency of prefetching systems.

As discussed above, the prefetching cost-benefit may be analyzed as a function of a number of factors, including probability of use, round-trip time (RTT), prefetch time, available bandwidth, object size, etc. Illustrative equations to this effect are described above with reference to FIG. 2. These various factors may be weighed to determine whether prefetching one or more objects is efficient, for example, as compared to downloading the object only when it is actually requested by the client.

Thus, a decision of whether to prefetch an object may be a function of certain variables, and determining the values of those variables with any certainty may be difficult. One reason for this difficulty is that a particular web page may include multiple levels and hierarchies of embedded objects. These hierarchies may make it difficult for a prefetcher to identify the objects and/or to associate the objects with the relevant webpage being requested.

As discussed above, in response to the request, a response parser may receive a response from a requested website. For example, a response is received at block 605 of FIG. 6. The response may include embedded objects (e.g., HTML, XML, CSS, Java Scripts, etc.) that may be needed to render a requested web page. Further, some of the embedded objects contain references to other embedded objects. To prefetch substantially all the objects associated with a webpage, it may be desirable to prefetch all the objects in the webpage's hierarchy that are likely to be subsequently requested by the browser. For example, it may be desirable to identify the root node of the response object, as described above with reference to block 710 of FIG. 7.

Figure 21:
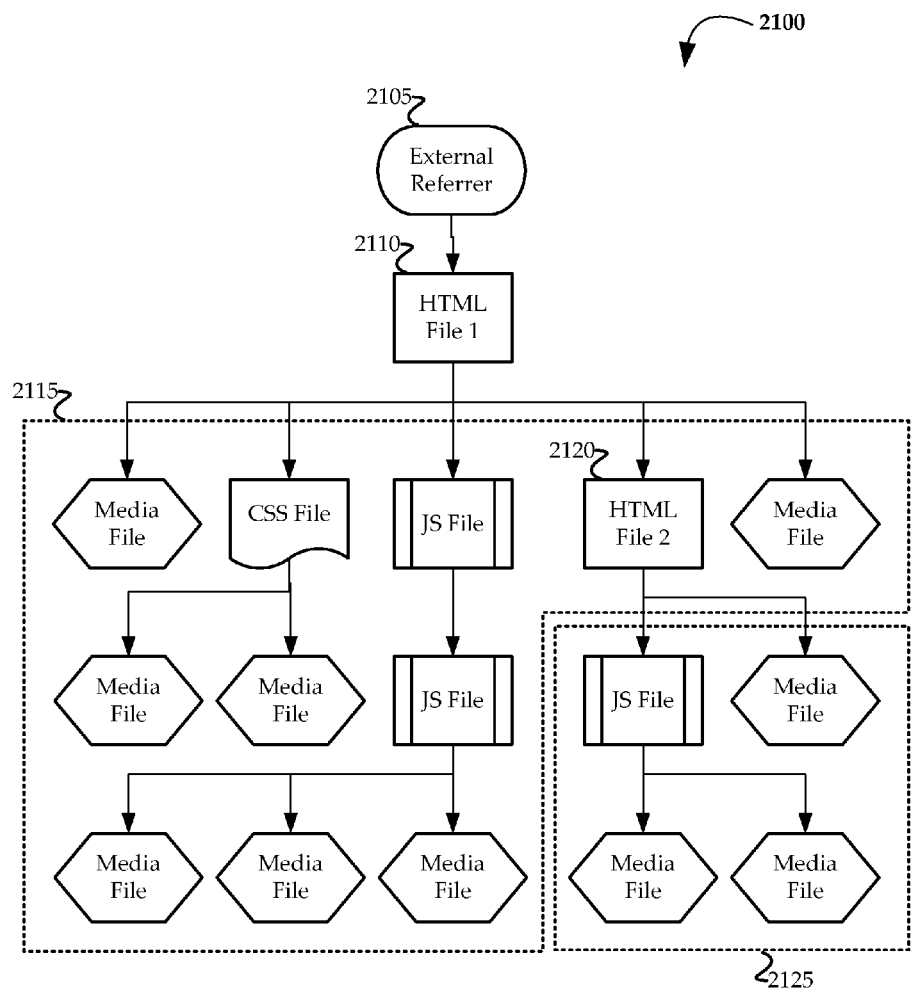
FIG. 21 illustrates one potential example of an object hierarchy in accordance with embodiments of the innovations presented herein.

Turning to FIG. 21, an object hierarchy is shown for a requested webpage. In FIG. 21, a webpage is requested that corresponds to a first HTML file 2110. The first HTML file 2110 references a number of embedded objects, including media files, CSS files, Java scripts, other HTML files, etc., some of which are illustrated. As shown, some of these embedded objects also have embedded objects. For example, an embedded HTML file 2120 references its own hierarchy of files (e.g., Java scripts, media files, etc.).

It will be appreciated from the above description that properly identifying this hierarchy in association with the requested webpage (e.g., or the associated first HTML file 2110) may significantly improve functionality of the prefetcher. In particular, it may be desirable to consider the requested webpage (e.g., the first HTML file 2110) as a "root node" at the top of the associated hierarchy of embedded objects. However, identifying the hierarchy may be difficult for at least two reasons. One reason is that properly identifying the hierarchy may involve identifying the parent and/or child(ren) of an object.

When a response to a request is received by a network component (e.g., the proxy server 132 of FIG. 1), the network component may typically be configured to associate the response with the request (i.e., to identify that the particular response resulted from the particular request). However, when a request is made, there may be no reliable way of knowing what caused the request. For example, suppose two websites are actively being downloaded, and the proxy server 132 receives a request for a media object from a client. The server may not know whether the request is for an embedded object of the first webpage, an embedded object of the second webpage, a new object being requested by the client, an embedded object of an embedded object, etc.

One clue to the "requester" of the file is known as the "referrer" (e.g., the HTTP referrer header). Typically, a requested object may include a referrer field (e.g., in the header) intended to identify the object that requested (e.g., embedded) that requested object. For example, when a user requests CNN.com, a number of object requests are embedded in the HTML file. When those objects are requested, some may indicate CNN.com (e.g., or, more precisely, "http://www.cnn.com/", or a similar root) as the referrer.

However, the referrer field may be unreliable. One reason may be that the referrer may be missing. For example, a chain of reference may be broken, such that no referrer is provided. Another reason may be that the referrer refers to an object that was never seen as part of a request. For example, the referring object may be cached at the client (e.g., stored in browser cache), or some other object never seen as part of a request.

Another reason is that the referrer may be incorrect (e.g., at least for the purposes of identifying the hierarchy). In one example, an advertisement or other content source may be indicated as the referrer, even when not the requested website. As such, the prefetcher may begin prefetching objects from unrequested domains (e.g., intermediate nodes of the hierarchy).

In another example, a site is visited by clicking on a search engine result. While it may be desirable to identify the requested site as the root node, the root node HTML file (e.g., HTML file 2110) may show a referrer as the search engine, improperly indicating that the requested site is not, in fact, the root node. Notably, if the prefetcher then treats the search engine as the root node, it may try to prefetch huge numbers of irrelevant objects from all over the Internet. In other words, it may be difficult or impossible to determine from the referrer whether objects are linked via a mouse click, an embedded relationship, etc.

In some embodiments, this issue is addressed by creating a separate root node for every HTML file. In the illustrated hierarchy of FIG. 21, a separate root node and a separate associated hierarchy is associated with the first HTML file 2110 and its embedded HTML file 2120. For example, the first HTML file 2110 would be associated with a first hierarchy 2115 and the embedded HTML file 2120 would be associated with a second hierarchy 2125. The prefetcher may then be configured such that, when the first HTML file 2110 is downloaded, first hierarchy 2115 is prefetched, and when the embedded HTML file 2120 is downloaded, the second hierarchy 2125 is prefetched.

Notably, another potential issue is that the browser may request only a subset of the nodes in the object hierarchy associated with a root node. This may result for various reasons, such as because content of the root node may have changed, certain objects may be in browser cache, etc. One potential issue, for example, is that the prefetcher may not prefetch objects associated with an intermediate node until the intermediate node is processed. As such, the prefetcher may effectively wait until the intermediate node is received and processed, and only then begin to prefetch the objects associated with that intermediate node. Another potential issue, for example, is that the intermediate node may be cached (e.g., in browser cache), and the browser may, therefore, not request the file when the first HTML file 2110 is downloaded. As such, the objects under the intermediate node hierarchy may never be prefetched.

According to some embodiments, any children of the CSS file may already be associated with the root node and may be prefetched accordingly, even when the CSS file is not. In certain embodiments, a referrer tree is maintained to model the nodes of the hierarchy of each root node. The root node tree may include sub-trees for intermediate nodes. For example, a sub-tree may indicate the immediate referrer of an intermediate object (e.g., a CSS file or Java script). This may allow the children of the intermediate object to be properly traced up the hierarchy to the root node.

It is worth noting that the issues described above may typically occur only when objects are missed by initial prefetch scanning. For example, as described above with reference to FIG. 1, a response parser 144 may forward response objects to a prefetch scanner 146. The prefetch scanner 146 may then scan the parsed objects for embedded (e.g., "in-line") objects. Typically, when the prefetch scanner 146 finds the embedded object, it may be aware of the object's placement in the object hierarchy.

For example, if a response is received from a request for "site.com/index.html," the response can be readily associated with that root node. The response parser 144 and prefetch scanner 146 may then parse and scan the response, finding many of the embedded objects referenced by the root node response object (e.g., the "index.html" file). Because the objects are being found in this manner, their relationship to each other and to the root node may be known by the prefetcher. As such, objects for which the hierarchy is unknown are objects that were missed by the prefetch scanner 146 as part of the response processing.

Figure 22:
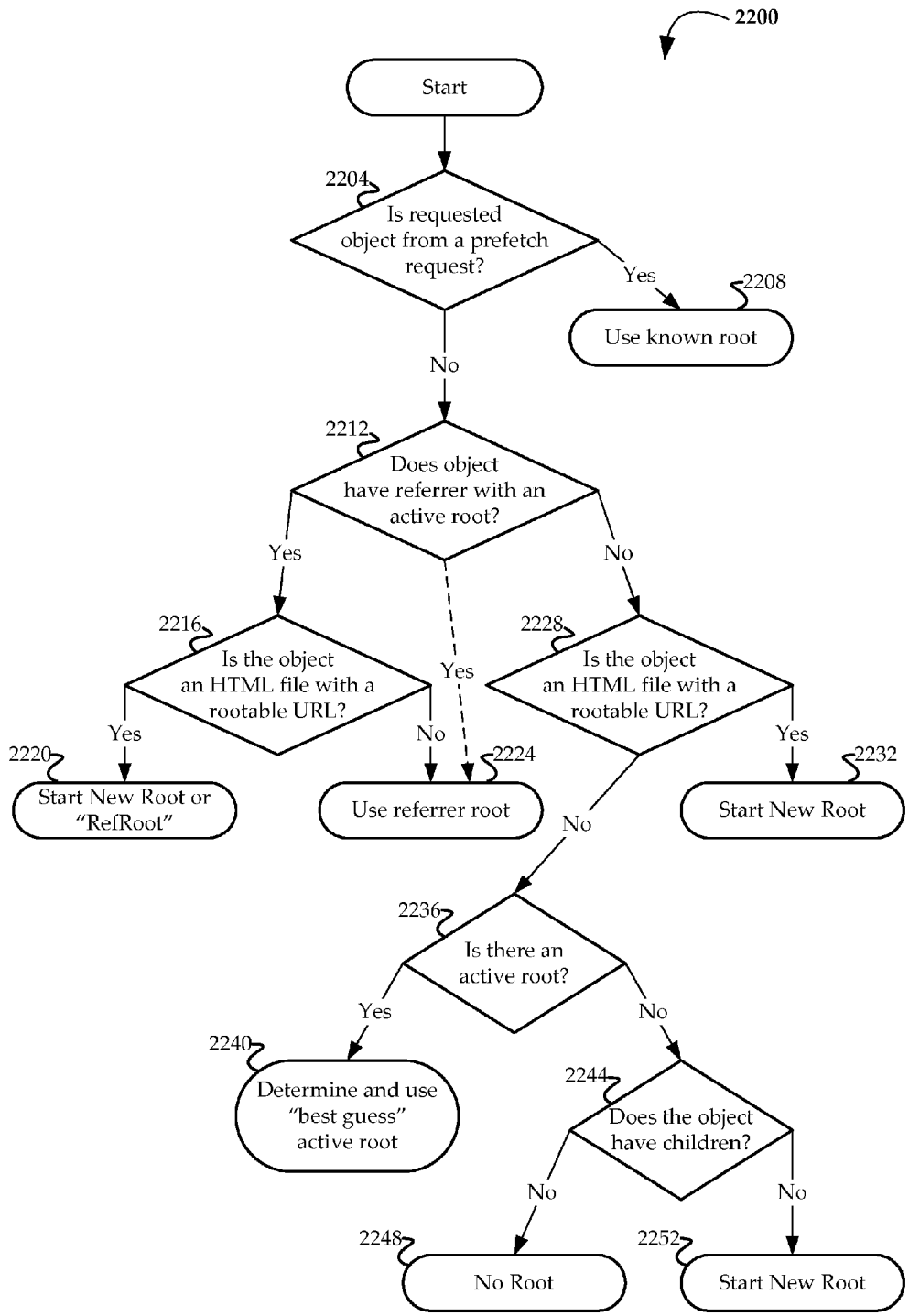
FIG. 22 shows a flow diagram describing one potential method for determining a root node of an object with embodiments of the innovations presented herein.

It will be appreciated from the above that reliably determining the root node of requested objects (e.g., and thereby maintaining accurate object hierarchies for each root node) may be difficult for a number of reasons. FIG. 22 shows an illustrative flow diagram of methods 2200 for determining a root node of an object, according to various embodiments. Notably, while embodiments of the methods 2200 may typically be more reliable than using the referrer alone, the determined root nodes may still not be "correct" in all cases.

Embodiments begin at block 2204 by determining whether the requested object is coming from a prefetch request. It may be assumed (e.g., particularly where a server-side prefetcher is used, for example, as described with reference to FIG. 1) that the prefetcher knows why it is prefetching the object. For example, as described above, when the prefetch scanner 146 finds the embedded object, it may be aware of the object's placement in the object hierarchy. As such, when the object is requested by the prefetcher, the known root node is used at block 2208 to place the object in the hierarchy of that root node.

If it is not determined at block 2204 that the requested object is coming from a prefetch request, another determination may be made at block 2212 as to whether the object has a referrer indicating an active root. As various webpages are being downloaded, each root node associated with those webpages may be considered as an active root. As such, according to the determination of block 2212, it may be assumed that if the referrer is indicating an active root, it is highly likely to be the correct referrer. For example, if CNN.com is the only webpage being downloaded, and the object indicates any other object as its referrer, that may indicate that the referrer is incorrect.

It is worth noting that the determination of block 2212 may be more involved when the active root is not the immediate parent of the object. As described above, a referrer tree may be used (e.g., with sub-trees) to describe the node hierarchy, such that an object can be traced all the way up the hierarchy to a root node. As such, determining whether the object has a referrer indicating an active root may, in fact, involve determining whether the referrer can be traced back through a referrer tree to an active root node.

If it is determined at block 2212 that the object has a referrer indicating an active root, some embodiments may simply use the referrer as the root at block 2224. However, as described above, this may cause undesirable results, for example, where the referrer is an HTML file. As such, in some embodiments, if it is determined at block 2212 that the object has a referrer indicating an active root, another determination may be made at block 2216 as to whether the object is an HTML file with a "rootable" URL.

Certain types of URLs are unlikely to represent client requests. For example, a URL pointing to an advertisement server, to an image repository for a website, to a long cache-busted string, etc. is unlikely to have been specifically requested by a user (e.g., it is more likely that these URLs are referenced (embedded) within a requested object). A list of these types of URLs may be maintained (e.g., or dynamically or otherwise generated), indicating URLs that are not "rootable." As a corollary, a "rootable" URL may be any URL not on that list. As such, the determination at block 2216 may, in fact, be whether the URL appears to be "rootable," or whether the URL does not appear to be a not "rootable" URL. In embodiments making the determination at block 2216, the referrer may be used as the root node for the object at block 2224 only when it is determined at block 2216 that the object is not an HTML file with a "rootable" URL (e.g., not an HTML file, not a "rootable" URL, etc.).

In some embodiments, if it is determined at block 2216 that the object is an HTML file with a "rootable" URL, a new root node is established for that HTML file at block 2220. For example, in the illustrated example of FIG. 21, a new root node may be associated with the embedded HTML file 2120, rather than using the first HTML file 2110 as the root node. In other embodiments, if it is determined at block 2216 that the object is an HTML file with a "rootable" URL, a special kind of root node call "RefRoot" is established for that HTML file at block 2220. The "RefRoot" node may indicate that the node is an HTML file embedded within an HTML file, so that the "RefRoot" HTML file hierarchy should be prefetched when the corresponding root node is requested.

For example, in the illustrated example of FIG. 21, a "RefRoot" node may be associated with HTML file 2120, indicating that HTML file 2120 is part of the prefetch tree when HTML file 2110 is requested. Suppose that, whenever a user wants to see recent baseball stats, the user visits "sports.com" (e.g., actually "sports.com/index.html"), then (e.g., while the "sports.com" homepage is still loading) clicks on a "baseball" tab (e.g., pointing to "sports.com/stats/daily/baseball/showstats.html"). Embodiments of the prefetcher may effectively begin to predict this behavior by using the "RefRoot" functionality at block 2220. Whenever the user submits a request for "sports.com," the object tree for the "index.html" file may begin to be prefetched, as well as the object tree for the associated "sports.com/stats/daily/baseball/showstats.html" file.

Returning to block 2212, if it is determined that the object does not have a referrer indicating an active root (e.g., that the object does not have a referrer at all or that the referrer is not to an active root), another determination may be made at block 2228 as to whether the object is an HTML file with a "rootable" URL. The determination at block 2228 may be substantially the same as the determination described above with reference to block 2216. As in block 2220, if it is determined at block 2228 that the object is an HTML file with a "rootable" URL, a new root node may be established for that HTML file at block 2232.

Recall that, in the case of block 2224, the requested object is not an HTML file (or not to have a rootable URL) and has a referrer with an active root, such that the referrer is a good candidate for use as the root node. However, where the requested object is not an HTML file (or not to have a rootable URL) and there is no referrer (or the referrer does not indicate an active root), it may not be possible or reliable to use the referrer as the root node. In some embodiments, if it is determined at block 2228 that the object is not an HTML file with a "rootable" URL, another determination may be made at block 2236 as to whether there are any active root nodes. For example, a determination may be made at block 2236 of whether any webpages are currently being downloaded that may be candidates for referrers or root nodes.

If it is determined at block 2236 that there is one active root node, that active root node may be used at block 2240 as the root node of the requested object. If it is determined at block 2236 that there are multiple active root nodes, a "best guess" may be made of the most appropriate active root to use as the root node of the requested object at block 2240. In one embodiment, the most appropriate active root may be determined as the most recent of the active roots to be requested. In another embodiment, the most appropriate active root may be determined as a root having the same domain as that of the requested object, if available. Similarly, in yet another embodiment, the most appropriate active root may be determined as a root having the same domain somewhere in its referrer tree as that of the requested object, if available. In still another embodiment, the most appropriate active root may be determined as the shortest-length root node. For example, if one active node is "sports.com" and another is "sports.com/stats/daily/baseball/showstats.html," it may be assumed more likely that the user explicitly requested the shorter URL (i.e., users may be less likely to type in longer URLs).

If it is determined at block 2236 that there is no active root node, another determination may be made at block 2244 as to whether the object has its own children. If it is determined at block 2244 that the object has its own children, a new root node may be established for the object at block 2252. If it is determined at block 2244 that the object has no children, it may not be worthwhile to associate the object with any particular root node hierarchy or to establish a root node just for that object. In that case, at block 2248, no root may be associated with the requested object.

Of course, the hierarchies may be used for a number of reasons inside and/or outside the context of a prefetcher. In one embodiment, hierarchies are used along with other prefetcher functionality described herein. For example, the hierarchies are used to determine which objects to prefetch, then other functionality (e.g., the cost-benefit analyses described above) are used to determine whether to push the prefetched objects to the user). In some embodiments, the hierarchies may be further used to affect one or more elements of the prefetching determinations. For example, determinations of probabilities of subsequent requests of a prefetched object may be affected by its association with a root node, its placement in a hierarchy, it association with intermediate nodes, etc.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configurator. Similarly, while various functionalities are ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added, and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method comprising:
   scanning a response to a first HTTP request for a web page in order to identify a web object for prefetching;
   prefetching, from a content server, the web object prior to a browser requesting the web object;
   observing a plurality of child HTTP requests that are associated with the response to the first HTTP request for the web page;
   determining a measure of success of the prefetching, wherein the measure of success is based on whether the web object was prefetched and whether the web object was later requested by the browser; and
   modifying, based on the measure of success, a success rate for the web object as associated with the web page;
   wherein determining the measure of success comprises, after a duration of time during which an indication is not received that the web object was later requested, generating an inference that the web object was not requested by the browser, and
   wherein modifying the success rate is based on the inference.

2. The method of claim 1 further comprising deciding, based on the success rate for the web object as associated with the web page, whether to prefetch the web object based on the success rate.

3. The method of claim 1 further comprising:
   scanning the response to the first HTTP request for the web page in order to identify a second web object;
   determining, based on a second success rate for the second web object, not to prefetch the second web object;
   determining a second measure of success, wherein the second measure of success is based on whether the second web object was later requested by the browser; and
   modifying, based on the measure of success, the second success rate.

4. The method of claim 2 wherein determining the measure of success comprises recording, at the client side of the communications system, that the web object is subsequently requested by a user machine communicatively coupled with the client side of the communications system; and
   communicating a first message from the client side of the communications system to a server side of the communications system indicating that the web object is subsequently requested by the user machine.

5. The method of claim 4 wherein modifying the success rate is performed at the server side of the communications system according to the first message received from the client side of the communications system.

6. The method of claim 5 further comprising using a prefetch model, wherein the prefetch model comprises a plurality of bins, each corresponding to a set of web object characteristics; wherein the success rate is associated with a first bin of the plurality of bins; and
   wherein prefetching the web object according comprises:
     assigning the web object to the first bin of the plurality of bins by substantially matching characteristics of the web object to the set of object characteristics which correspond to the first bin; and
     determining whether to prefetch the object based on the success rate associated with the first bin of the plurality of bins.

7. The method of claim 6, wherein updating the prefetch model at the server side of the communications system according to the message received from the client side of the communications system comprises:
   adjusting the success rate associated with the first bin of the plurality of bins according to the message.

8. The method of claim 6, wherein the prefetch model represents URL scanner factors, user-specific URL tracker factors, and global URL tracker factors.

9. The method of claim 8 wherein the URL scanner factors comprise:
   a container value; and
   a tag value.

10. The method of claim 8, wherein the global URL tracker factors comprise:
    a fails since success factor; and
    a number of successes factor.

11. The method of claim 6 wherein the prefetch model represents URL tracker factors such that the set of web object characteristics comprises a set of tracker factors;
    wherein the set of tracker factors comprise at least two of:
    a history of prefetch successes;
    a history of prefetch mistakes;
    a history of URL scanner misses;
    a page load age; and
    a scanner context associated with the web object for each page load.

12. The method of claim 6, wherein the prefetch model is determined at least in part according to ages of prefetch objects represented by the prefetch model.

13. The method of claim 4, wherein the first message indicates at least one of a hit, a miss, or a mistake.

14. A system comprising:
    a content server disposed at a server side of a communications system
    a client computer disposed at a client side of the communications system;
    a proxy server disposed at a server side of the communications system, and connected by communication links to the content server and the client computer, wherein the proxy server is configured to:
      scan a response from the content server to a first HTTP request for a web page from the client computer in order to identify a web object for prefetching;
      prefetch the web object prior to the client computer requesting the web object;

observe a plurality of child HTTP requests from the client computer that are associated with the response to the first HTTP request for the web page from the content server;

determine a measure of success of the prefetching, wherein the measure of success is based on whether the web object was prefetched and whether the web object was later requested by the browser;

modify, based on the measure of success, a success rate for the web object as associated with the web page;

wherein the processor is further configured to, after a duration of time during which an indication is not received that the web object was later requested, generate an inference that the web object was not later requested by the client side of the communications system, and wherein the processor is further configured to modify the success rate based on the inference.

15. The system of claim 14 wherein the proxy server determines the measure of success following receipt of a first message from the client computer indicating that the web object is requested by the user machine.

16. The system of claim 14 wherein the proxy server is further configured to update a prefetch model according to a first message received from the client computer.

17. The system of claim 14, further comprising:
a proxy client, in operative communication with the proxy server, and wherein the proxy client is configured to:
record whether the prefetch object is subsequently requested by a user machine communicatively coupled with the proxy client; and
communicate a first message to the proxy server indicating whether the prefetch object is subsequently requested by the user machine.

18. A non-transitory machine-readable medium for selective prefetch scanning in a communications system, the machine-readable medium having non-transitory instructions stored thereon which, when executed by a machine, cause the machine to perform steps, the program code comprising:
program code for scanning a response to a first HTTP request for a web page in order to identify a web object for prefetching;
program code for prefetching, from a content server, the web object prior to a browser requesting the web object;
program code for observing a plurality of child HTTP requests that are associated with the response to the first HTTP request for the web page;
program code for determining a measure of success of the prefetching, wherein the measure of success is based on whether the web object was prefetched and whether the web object was later requested by the browser; program code for modifying, based on the measure of success, a success rate for the web object as associated with the web page;
wherein the program code for determining the measure of success comprises program code for, after a duration of time during which an indication is not received that the web object was later requested, generating an inference that the web object was not later requested by the client side of the communications system, and wherein the program code for modifying the success rate comprises program code for modifying the success rate based on the inference.

19. The non-transitory machine-readable medium of claim 18, wherein the program code further comprises program code for deciding, based on the success rate for the web object as associated with the web page, whether to prefetch the web object based on the success rate.

20. The non-transitory machine-readable medium of claim 18, wherein the program code further comprises:
program code for scanning the response to the first HTTP request for the web page in order to identify a second web object;
program code for determining, based on a second success rate, not to prefetch the second web object;
program code for determining a second measure of success, wherein the second measure of success is based on whether the second web object was later requested by the browser; and
program code for modifying, based on the measure of success, the second success rate.

* * * * *